(12) United States Patent
Shin et al.

(10) Patent No.: US 11,563,608 B2
(45) Date of Patent: Jan. 24, 2023

(54) METHOD AND APPARATUS FOR SIGNAL MODULATION AND DEMODULATION IN WIRELESS COMMUNICATION SYSTEM

(71) Applicant: ELECTRONICS AND TELECOMMUNICATIONS RESEARCH INSTITUTE, Daejeon (KR)

(72) Inventors: Wooram Shin, Daejeon (KR); Kyeongpyo Kim, Daejeon (KR); Young-Jo Ko, Daejeon (KR); Kapseok Chang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/545,089

(22) Filed: Dec. 8, 2021

(65) Prior Publication Data

US 2022/0182271 A1 Jun. 9, 2022

(30) Foreign Application Priority Data

Dec. 8, 2020 (KR) .................. 10-2020-0170882
Dec. 8, 2021 (KR) .................. 10-2021-0175250

(51) Int. Cl.
*H04L 27/26* (2006.01)
*H04L 27/01* (2006.01)

(52) U.S. Cl.
CPC .......... *H04L 27/2601* (2013.01); *H04L 27/01* (2013.01)

(58) Field of Classification Search
CPC ..... H04L 27/2601; H04L 27/01; H04L 27/28; H04L 23/02
See application file for complete search history.

(56) References Cited

U.S. PATENT DOCUMENTS 8,611,464 B2  12/2013  Han et al.
9,467,989 B2  10/2016  Kishiyama et al.
(Continued)

FOREIGN PATENT DOCUMENTS

EP  3576312 A1  12/2019
KR  10-2018-0066080 A  6/2018
(Continued)

OTHER PUBLICATIONS

Wooram Shin et al., "Performance Comparison of Equalization Schemes for OTFS over Time-Varying Multipath Channels", ICTC 2020 IEEE.
(Continued)

*Primary Examiner* — Khanh C Tran
(74) *Attorney, Agent, or Firm* — LRK Patent Law Firm

(57) ABSTRACT

An operation method of a first communication node may include: mapping data symbols to be transmitted to a second communication node of the communication system to resources in a first two-dimensional (2D) domain; pre-processing the data symbols mapped to the resources in the first 2D domain to spread the data symbols on resources in a second 2D domain; mapping the pre-processed data symbols to the resources in the second 2D domain; and performing multi-carrier modulation on the data symbols mapped to the resources in the second 2D domain for each of the resources in the second 2D domain.

18 Claims, 10 Drawing Sheets

(56) References Cited

U.S. PATENT DOCUMENTS

| | | |
|---|---|---|
| 10,693,581 B2 | 6/2020 | Rakib et al. |
| 2007/0165588 A1* | 7/2007 | McCoy ............... H04L 27/2672 370/344 |
| 2017/0012810 A1* | 1/2017 | Rakib ................... H04L 5/0016 |
| 2017/0033899 A1* | 2/2017 | Rakib ................. H04L 27/2655 |
| 2017/0099122 A1* | 4/2017 | Hadani ............... H04L 27/2639 |
| 2018/0262306 A1 | 9/2018 | Hadani et al. |
| 2019/0364553 A1 | 11/2019 | Ko et al. |
| 2020/0280971 A1 | 9/2020 | Moon et al. |

FOREIGN PATENT DOCUMENTS

| | | |
|---|---|---|
| KR | 10-2019-0008827 A | 1/2019 |
| WO | 2017/044660 A1 | 3/2017 |
| WO | 2017173461 A1 | 10/2017 |

OTHER PUBLICATIONS

R. Hadani, et al. "Orthogonal Time Frequency Space Modulation", 2017 IEEE.

\* cited by examiner

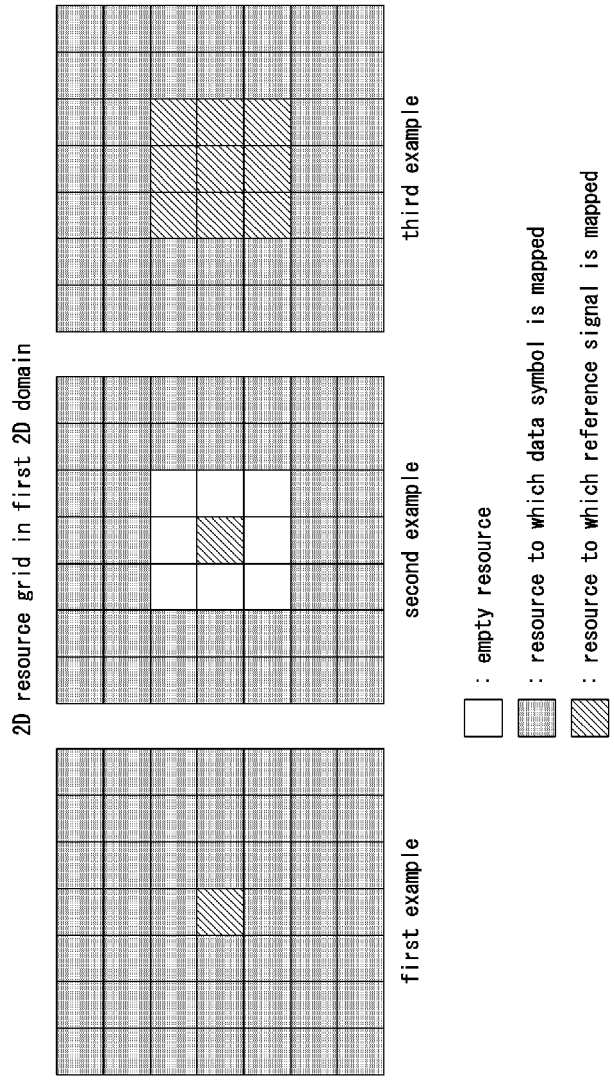

METHOD AND APPARATUS FOR SIGNAL MODULATION AND DEMODULATION IN WIRELESS COMMUNICATION SYSTEM

CROSS-REFERENCE TO RELATED APPLICATIONS

This application claims priority to Korean Patent Applications No. 10-2020-0170882 filed on Dec. 8, 2020 and No. 10-2021-0175250 filed on Dec. 8, 2021 with the Korean Intellectual Property Office (KIPO), the entire contents of which are hereby incorporated by reference.

BACKGROUND

1. Technical Field

The present disclosure relates to a technique for modulation and demodulation in a wireless communication system, and more particularly, to a modulation and demodulation technique for efficiently performing modulation and demodulation of a multi-carrier waveform in a wireless communication system.

2. Description of Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

For processing of wireless data that rapidly increases after commercialization of a 4G communication system, technologies for a 5G communication system or a later communication system that can use not only a frequency band of the 4G communication system (e.g., frequency band of 6 GHz or below) but also a frequency band higher than the frequency band of the 4G communication system (e.g., frequency band of 6 GHz or above) are being studied.

In an exemplary embodiment of the communication system, for modulation and demodulation, an orthogonal frequency division multiplexing (OFDM) scheme or an orthogonal frequency division multiple access (OFDMA) scheme may be used. The OFDM scheme or OFDMA scheme may have advantages of relatively high frequency efficiency and simple implementation. The OFDM scheme or OFDMA scheme may be characterized in that data symbols are transmitted as mapped to time-frequency two-dimensional resources. The time-frequency two-dimensional resources may have an interval equal to an OFDM symbol interval in the time domain, and may have an interval equal to a subcarrier spacing between them in the frequency domain.

In an ideal channel, data symbols modulated based on the OFDM scheme or OFDMA scheme and transmitted on time-frequency two-dimensional resources may be orthogonal to each other. In practice, a channel through which the symbols are transmitted may not be ideal. For example, the channel may be a delay spread channel, and/or a Doppler spread channel. The channel may be a frequency selective channel, and/or a time selective channel. Orthogonality between data symbols transmitted through a non-ideal channel may not be guaranteed. On the other hand, when a channel on one time-frequency resource through which one data symbol is transmitted has a low channel gain value due to channel degradation such as fading, it may be difficult to successfully detect or decode the corresponding data symbol.

Matters described as the prior arts are prepared to promote understanding of the background of the present disclosure, and may include matters that are not already known to those of ordinary skill in the technology domain to which exemplary embodiments of the present disclosure belong.

SUMMARY OF THE INVENTION

In order to solve the above-identified problems, exemplary embodiments of the present disclosure are directed to providing a modulation and demodulation method based on spreading of data symbols, for enhancing radio signal transmission/reception performance through a radio channel.

According to an exemplary embodiment of the present disclosure for achieving the above-described objective, an operation method of a first communication node may comprise: mapping data symbols to be transmitted to a second communication node of the communication system to resources in a first two-dimensional (2D) domain; pre-processing the data symbols mapped to the resources in the first 2D domain to spread the data symbols on resources in a second 2D domain; mapping the pre-processed data symbols to the resources in the second 2D domain; and performing multi-carrier modulation on the data symbols mapped to the resources in the second 2D domain for each of the resources in the second 2D domain.

The mapping to the resources in the first 2D domain may comprise: identifying information on a plurality of first spreading resource blocks constituting the first 2D domain; and mapping the data symbols to each of the plurality of first spreading resource blocks.

A first dimension of the first 2D domain may be a delay domain, a second dimension of the first 2D domain may be a Doppler domain, and the plurality of first spreading resource blocks may correspond to delay-Doppler resource blocks.

The mapping to the resources in the second 2D domain may comprise: identifying information on a plurality of second spreading resource blocks constituting the second 2D domain; and mapping the data symbols pre-processed after being mapped to each of a plurality of first spreading resource blocks constituting the first 2D domain to each of the plurality of second spreading resource blocks.

A first dimension of the second 2D domain may be a frequency domain, a second dimension of the second 2D domain may be a time domain, and the plurality of second spreading resource blocks may correspond to frequency-time resource blocks.

The operation method may further comprise, before the mapping to the resources in the first 2D domain, performing, with the second communication node, a signaling procedure for information on a size of a plurality of spreading resource blocks constituting the first 2D domain and the second 2D domain.

The performing of the signaling procedure may comprise receiving signaling information on the size of the plurality of spreading resource blocks from the second communication node that provides a communication service to the first communication node.

The performing of the signaling procedure may comprise signaling, by the first communication node, information on the size of the plurality of spreading resource blocks to one or more communication nodes including the second communication node providing a communication service.

The performing of the signaling procedure may comprise: performing, with the second communication node, a signaling procedure for information of candidates of the size of the plurality of spreading resource blocks; and performing, with the second communication node, a signaling procedure for information indicating one of the candidates of the size of the plurality of spreading resource blocks.

According to another exemplary embodiment of the present disclosure for achieving the above-described objective, an operation method of a first communication node may comprise: performing multi-carrier demodulation on radio signals received from a second communication node of the communication system for each of resources in a first two-dimensional (2D) domain; de-mapping data symbols mapped to the resources in the first 2D domain from the resources in the first 2D domain based on a result of the multi-carrier demodulation; post-processing the data symbols de-mapped from the resources in the first 2D domain to de-spread the data symbols to resources in a second 2D domain; and de-mapping the post-processed data symbols from the resources in the second 2D domain.

The de-mapping from the resources in the first 2D domain may comprise: identifying information on a plurality of first spreading resource blocks constituting the first 2D domain; and de-mapping the data symbols mapped to each of the plurality of first spreading resource blocks from the plurality of first spreading resource blocks, wherein a first dimension of the second 2D domain is a frequency domain, a second dimension of the second 2D domain is a time domain, and the plurality of first spreading resource blocks correspond to frequency-time resource blocks.

The de-mapping from the resources in the first 2D domain may comprise: identifying information on a plurality of second spreading resource blocks constituting the first 2D domain; and de-mapping the data symbols post-processed and mapped to each of the plurality of second spreading resource blocks from the plurality of second spreading resource blocks, wherein a first dimension of the first 2D domain is a delay domain, a second dimension of the first 2D domain is a Doppler domain, and the plurality of second spreading resource blocks correspond to delay-Doppler resource blocks.

The operation method may further comprise, before the multi-carrier demodulation, performing, with the second communication node, a signaling procedure for information on a size of a plurality of spreading resource blocks constituting the first 2D domain and the second 2D domain.

The performing of the signaling procedure may comprise receiving signaling information on the size of the plurality of spreading resource blocks from the second communication node that provides a communication service to the first communication node.

The performing of the signaling procedure may comprise signaling, by the first communication node, information on the size of the plurality of spreading resource blocks to one or more communication nodes including the second communication node providing a communication service.

The performing of the signaling procedure may comprise performing, with the second communication node, a signaling procedure for information of candidates of the size of the plurality of spreading resource blocks; and performing, with the second communication node, a signaling procedure for information indicating one of the candidates of the size of the plurality of spreading resource blocks.

The operation method may further comprise, after the de-mapping from the resources in the first 2D domain, performing channel equalization in the first 2D domain for the data symbols de-mapped from the resources in the first 2D domain.

The performing of the channel equalization in the first 2D domain may comprise: performing channel estimation in the first 2D domain; calculating channel equalization coefficients in the first 2D domain based on a result of the channel estimation in the first 2D domain; and performing the channel equalization in the first 2D domain based on the calculated channel equalization coefficients in the first 2D domain.

The operation method may further comprise, after the de-mapping from the resources in the second 2D domain, performing channel equalization in the second 2D domain for the data symbols de-mapped from the resources in the second 2D domain.

The operation method may further comprise, before the multi-carrier demodulation, transmitting, to the second communication node, a terminal capability report related to channel equalization in at least one of the first 2D domain and the second 2D domain.

According to an exemplary embodiment of the present disclosure, information bits in a transport block may be transmitted and received based on a modulation and demodulation operation of a multi-carrier waveform based on spreading of multiple two-dimensional (2D) resource blocks. Accordingly, a diversity gain of a channel experienced by each symbol in a codeword can be improved. In addition, interference between data symbols according to multiplexing can be reduced or limited due to channel spreading.

According to an exemplary embodiment of the present disclosure, multi-carrier demodulation and channel equalization may be performed for each 2D resource block in a receiving node. Accordingly, reception processing delay can be reduced. Here, the channel equalization may be performed based on a linear channel equalization scheme or a turbo channel equalization scheme. Accordingly, an error rate such as BER, SER, and BLER can be reduced, and reception performance of the receiving node can be improved.

BRIEF DESCRIPTION OF DRAWINGS

FIG. 6 is a conceptual diagram illustrating exemplary embodiments of a data symbol and reference signal (RS) mapping scheme for resources in a first 2D domain in a communication system.

DETAILED DESCRIPTION OF THE EMBODIMENTS

Figure 1:
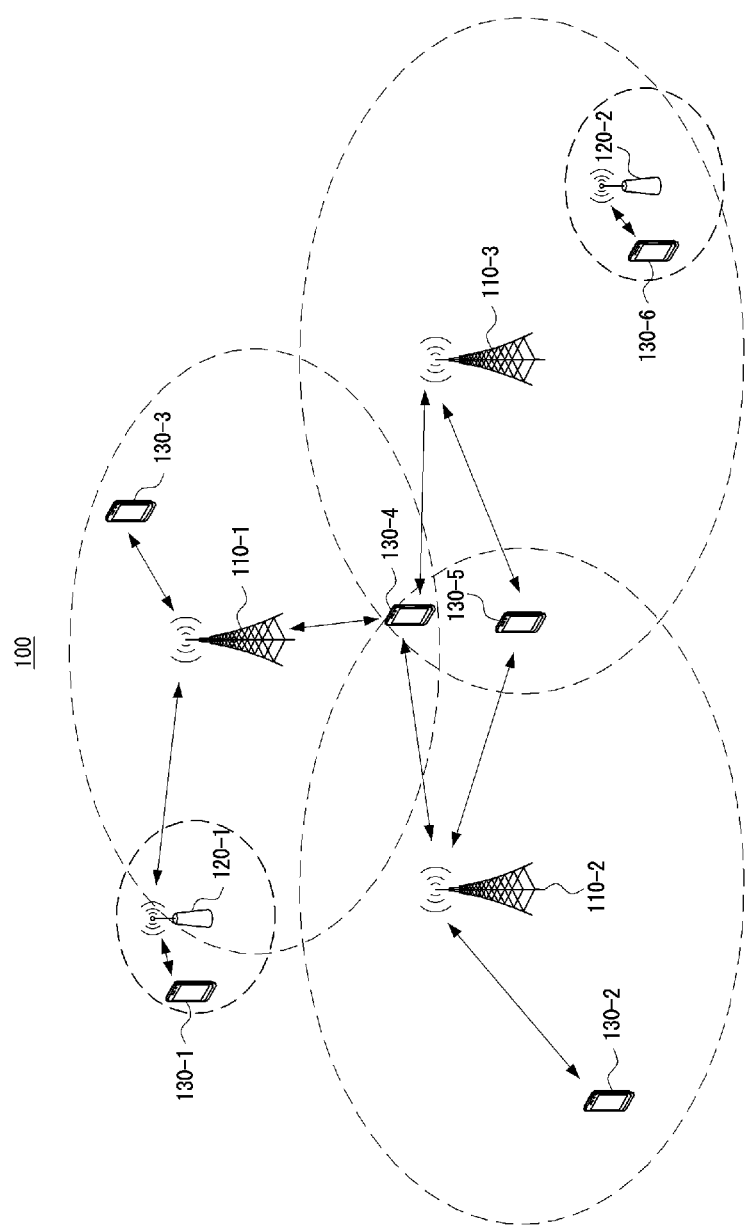
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
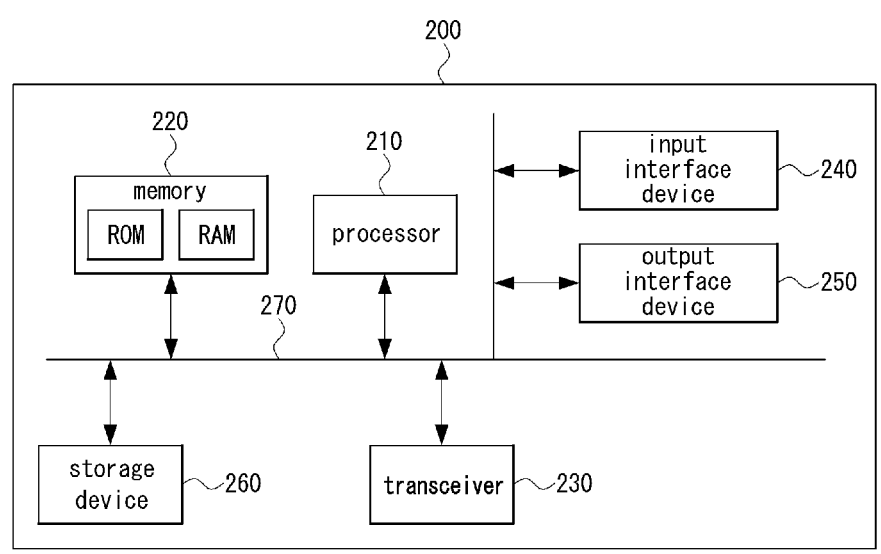
FIG. 2 is a block diagram illustrating an exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in general, a transmitter may input a transport block (TB) composed of information (or message) bits to be transmitted into a channel coding block, and the channel coding block may output bits coded according to a given code rate (or, a modulation and coding scheme (MCS) level related to a data symbol modulation order and a channel code rate) through a channel coding process. The channel coding block may be configured with all or part of calculation and addition of cyclic redundancy check (CRC) bits of the TB, code block (CB) segmentation (when a size of the TB exceeds a certain size) for segmenting the CRC bits-added TB into multiple code blocks), calculation and addition of CRC bits for each CB, channel encoding for each CB, rate matching (RM) and hybrid automatic repeat request (HARD) processing for each CB, bit interleaving, and CB concatenation for concatenation of coded bits of a plurality of CBs. In the above, when a TB is not segmented into a plurality of CBs, it may not be required to calculate and add CRC bits for each CB, the remaining functional blocks are performed on the TB to which CRC bits are added, and the last CB concatenation may not be required. In the case of rate matching, the code rate may be adjusted by performing puncturing, shortening, and/or repetition on the coded bits that are outputs of the channel encoding. As the channel encoding, various channel coding schemes such as turbo code, low density parity check (LDPC) code, and polar code may be applied. The coded bits that are outputs of the channel coding block may be subjected to scrambling (bit-level scrambling), and then input to a modulation/constellation mapper, and output as data symbols through a data modulation process.

Hereinafter, each set of data symbols for each TB, which is output through the channel encoding process and the data modulation process, may be referred to as a codeword. That is, one TB and one codeword are regarded as having one-to-one correspondence. Additionally, the transmitter may perform the following additional procedures on the data symbols (or symbols spread on resources in a second two-dimensional (2D) domain (or region) to be described below) for multi-antenna transmission. The transmitter may map data symbols belonging to the codeword(s) (or symbols spread on resources in a second two-dimensional domain to be described below) to layer(s). Accordingly, when a plurality of TBs are transmitted, respective codewords may be mapped to different layer(s). Data symbols belonging to different codewords (or symbols spread on resources in a second two-dimensional domain to be described below) may be restricted to be mapped only to different layers. Data symbols mapped to each layer (or symbols spread on resources in a second two-dimensional domain to be described below) may be spread to each antenna port through multi-antenna pre-processing.

After a two-dimensional (partial) spreading multi-carrier modulation process to be described below in the baseband, the transmitter may convert the output signals into analog signals through a digital-to-analog converter (DAC), and then transmit the analog signals to a receiver through an analog/RF stage and an antenna. The receiver may convert a RF band signal received from the transmitter through a reception antenna into a digital signal through an analog/RF stage and an analog-to-digital converter (ADC), and then perform a two-dimensional (partial) de-spread multi-carrier demodulation process to be described below in the base band.

The receiver may decode data symbols detected after the demodulation process through the following process. The detected data symbols may be input to a modulation/constellation de-mapper, and log-likelihood ratios (LLRs) for the coded bits may be output. After the LLRs of the coded bits output in this manner are descrambled and a channel decoding process on the descrambled LLRs is performed in a channel decoding block, information bits of a corresponding TB and a CRC-check result of the TB may be output. If the CRC-check for the corresponding TB is successful, it may be regarded as a decoding success, otherwise it may be regarded as a decoding failure. The channel decoding block may segment (de-concatenate) the codeword into a plurality of CBs when the codeword is composed of the plurality of CBs, and may perform bit deinterleaving for each CB, rate de-matching and LLR combining for each CB, channel decoding for each CB, CRC check for each CB, CB concatenation/de-segmentation (i.e., concatenations of decoded bits for the respective CBs), and CRC verification for the TB. When the received codeword is not composed of a plurality of CBs, the CB segmentation is unnecessary, and the remaining functional blocks may be performed on the codeword itself. CRC check for each CB and CB concatenation may be unnecessary, and whether or not CRC has passed may be checked from the information bits and CRC bits of the corresponding TB, which are outputs of decoding.

Hereinafter, in case of downlink (DL), the transmitter may be a base station, a repeater, a transmission point (TP), or a transmission and reception point (TRP), and the receiver may be a terminal (e.g., device or mobile device) or a user equipment (UE). In case of uplink (UL), the transmitter may be a terminal or a user equipment, and the receiver may be a base station, a repeater, a TP, or a TRP. Unless otherwise stated, the transmitter and receiver do not distinguish a link direction. In case of sidelink (SL), the transmitter and the receiver may be different terminals.

Hereinafter, modulation and demodulation methos in a wireless communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

In the present disclosure, in describing modulation and demodulation methods in a wireless communication system, parameters as shown in Table 1 may be used.

TABLE 1

| | |
|---|---|
| $M_g$: | the number of grid points of the first dimension (delay?) of g-th resource group in a first 2 |
| $N_g$: | the number of grid points of the second dimension (Doppler?) of g-th resource group in a |
| M: | the number of grid points of the first dimension (frequency?) in a second 2D domain (e.g., the number of subcarriers in a multicarrier symbol), |
| N: | the number of grid points of the second dimension (time?) in a ( second 2D domain the number of multicarrier symbols in a transmission time interval (TTI) or a (mini-) slot/s |
| $\overline{M}$ (typically $\geq$ M): a length of transmit MC pulse, | |
| $\tilde{M}$ (typically $\geq \overline{M}$): a length of receive MC pulse | |

Meanwhile, in the present disclosure, in describing modulation and demodulation methods in a wireless communication system, notations as shown in Table 2 may be used.

TABLE 2

| |
|---|
| $[A]_{M \times N}$ denotes a M × N matrix, |
| $[A]_{\kappa, \iota}$ denotes an element in κ-th row and ι-th column of matrix A, |
| $[a]_{M \times 1}$ and $[a]_M$ denotes a length-M vector, |
| $[a]_\kappa$ denotes κ-th element of vector a, |
| $\iota := \sqrt{-1}$ |
| $[K] := \{0, 1, \ldots, K - 1\}$ for K ∈ ℕ |

Meanwhile, discrete Fourier transform (DFT), inverse DFT (IDFT), Walsh-Hadamard transform (WHT), and inverse WHT (IWHT) mentioned in the present disclosure may be those to which normalization is applied, so that magnitudes of an input signal and an output signal are not different.

Figure 3:
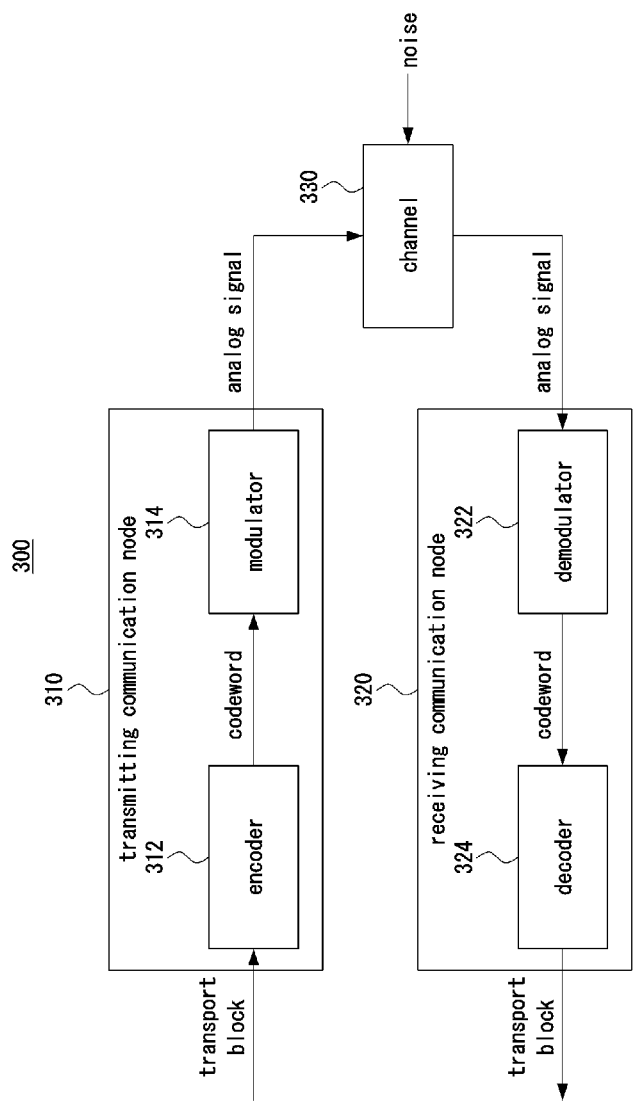
FIG. 3 is a block diagram illustrating an exemplary embodiment of a communication system including a transmitting node and a receiving communication node.

FIG. 3 is a block diagram illustrating an exemplary embodiment of a communication system including a transmitting node and a receiving communication node.

Referring to FIG. 3, a communication system 300 may include a plurality of communication nodes. Some of the communication nodes of the communication system 300 may operate as a transmitting communication node that performs a radio signal transmission operation. The transmitting communication node may be referred to as a 'transmitting node'. On the other hand, some of the communication nodes of the communication system 300 may operate as a receiving communication node that performs a radio signal reception operation. The receiving communication node may be referred to as a 'receiving node'. In an exemplary embodiment of the communication system 300, each of the communication nodes may operate as a transmitting node and/or a receiving node. FIG. 3 shows an exemplary embodiment of the communication system 300 including a communication node operating as a transmitting node 310 and a communication node operating as a receiving node 320 at a specific time point. However, this is only an example for convenience of description, and exemplary embodiments of the present disclosure are not limited thereto.

The transmitting node 310 may modulate symbols or signals to be transmitted to the receiving node 320. The transmitting node 310 may transmit the modulated signals through an antenna or an emitter. The signals transmitted from the transmitting node 310 may be transmitted through a channel or medium by being loaded on a transmission waveform. The receiving node 320 may receive the signals transmitted through the channel or medium by using an antenna or a collector. The receiving node 320 may restore the desired signals to be transmitted by the transmitting node 310 by demodulating the received signals based on a reception waveform. Here, the original signals to be transmitted by the transmitting node 310 to the receiving node 320 may include various types of symbols or signals such as data symbols, pilot symbols, and reference signals. In the present disclosure, exemplary embodiments of a modulation and demodulation method and apparatus in a wireless communication system will be described by taking as an example operations in which the transmitting node 310 and the receiving node 320 mutually transmit/receive original signals that are data symbols. However, this is only an example for convenience of description, and exemplary embodiments of the present disclosure are not limited thereto. For example, exemplary embodiments of the present disclosure may be equally or similarly applied to an operation of transmitting and receiving various types of original signals such as pilot symbols and reference signals.

Specifically, the communication system 300 may include the transmitting node 310 for transmitting a signal, the receiving node 320 for receiving the signal from the transmitting node 310, and a channel 330 through which the signal is delivered between the transmitting node 310 and the receiving node 320. The transmitting node 310 may include an encoder 312, a modulator 314, and the like, and the receiving node 320 may include a demodulator 322, a decoder 324, and the like. Here, the encoder 312, the modulator 314, the demodulator 322, and the decoder 324 may be referred to as 'encoder', 'modulator', 'demodulator', and 'decoder', respectively.

The transmitting node 310 and the receiving node 320 may correspond to a base station (e.g., base stations 110-1, 110-2, 110-3, 120-1, and 120-2 shown in FIG. 1) and a terminal (e.g., terminals 130-1, 130-2, 130-3, 130-4, 130-5, and 130-6 shown in FIG. 1), respectively. When the transmitting node 310 is a base station, the receiving node 320 may be a terminal. Alternatively, when the transmitting node 310 is a terminal, the receiving node 320 may be a base station or another terminal. Each of the transmitting node 310 and the receiving node 320 may be configured to be the same as or similar to the communication node 200 shown in FIG. 2.

The transmitting node 310 may perform an encoding process and a modulation process before transmitting a TB to the receiving node 320. The encoder 312 may perform the encoding process on the TB. Specifically, the encoder 312 may encode the TB into a codeword including a plurality of CBs. In this case, the encoder 312 may segment the TB into small blocks. The encoder 312 may configure a block set by grouping an arbitrary number of segmented blocks. The number of blocks may be determined by a channel environment of a communication network, performance information of the transmitting node 310 and the receiving node 320, and requirements of application programs. The encoder 312 may perform encoding on a block set basis. The encoder 312 may transmit the coded codeword to the modulator 314.

The modulator 314 may generate modulation symbols by modulating the codeword. The modulator 314 may modulate the codeword into symbols using various modulation schemes. The modulation may mean converting strength, displacement, frequency, or phase of a signal (information) into an appropriate form, in accordance with channel characteristics of a transmission medium. The modulation may be a process of converting a signal containing data into a waveform suitable for a transmission channel.

The transmitting node 310 may map the modulation symbols to time/frequency resources, and may transmit a signal generated based on the mapped symbols to the receiving node 320 through the channel 330 formed between the transmitting node 310 and the receiving node 320. Specifically, the signals propagated through an antenna of the transmitting node 310 may be transmitted to an antenna of the receiving node 320 through the channel 330. In this case, noise may be generated on the channel.

The signal received through the antenna of the receiving node 320 may be transmitted to the demodulator 322. The demodulator 322 may demodulate the signal according to a demodulation scheme determined according to the channel environment. The demodulator 322 may generate a codeword by demodulating the signal, and may deliver the demodulated codeword to the decoder 324. The decoder 324 receiving the demodulated codeword may decode the codeword to obtain an output TB.

Figure 4:
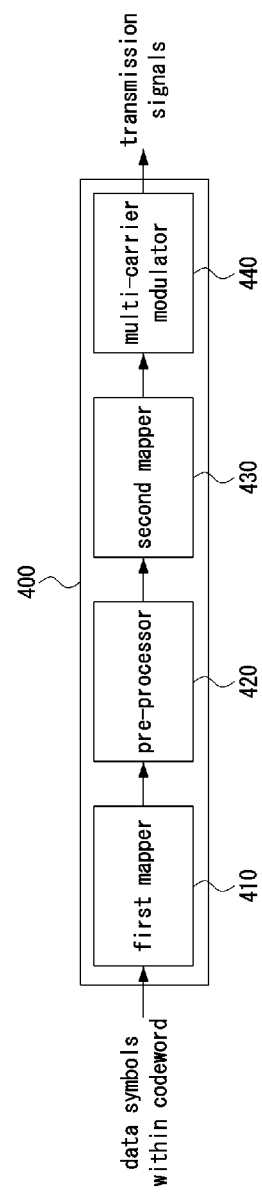
FIG. 4 is a block diagram illustrating an exemplary embodiment of a modulator of a transmitting node in a communication system.

FIG. 4 is a block diagram illustrating an exemplary embodiment of a modulator of a transmitting node in a communication system.

Referring to FIG. 4, a transmitting node in a communication system may include a modulator 400. Here, the modulator may be the same as or similar to the modulator 314 of the transmitting node 310 described with reference to FIG. 3. The modulator 400 may receive a codeword generated from a TB through a process such as encoding or data symbols within the codeword. The modulator 400 of the transmitting node may output transmission signals by modulating the input codeword or data symbols within the codeword. In an exemplary embodiment of the communication system, the modulator 400 may include components such as a first mapper 410, a pre-processor 420, a second mapper 430, and a multi-carrier modulator 440. However, this is only an example for convenience of description, and exemplary embodiments of the present disclosure are not limited thereto.

The first mapper 410 of the modulator 400 may map the input data symbols to resources in a first two-dimensional (2D) domain. Then, the pre-processor 420 of the modulator 400 may perform pre-processing or precoding for spreading the respective data symbols mapped to the resources in the first 2D domain to resources in a second 2D domain. Then, the second mapper 430 of the modulator 400 may map the pre-processed data symbols to the resources in the second 2D domain. Then, the multi-carrier modulator 440 of the modulator 400 may perform multi-carrier modulation on the data symbols mapped to the resources in the second 2D domain after pre-processing, for each resource in the second 2D domain. Here, the multi-carrier modulation on the data symbols for each resource in the second 2D domain may mean that multi-carrier modulation is performed for each OFDM symbol. Specifically, the multi-carrier modulator 440 may generate transmission signals by modulating the data symbols mapped to resources in the second 2D domain after pre-processing into individual waveforms for each corresponding resource in the second 2D domain. The transmission signals generated by the multi-carrier modulator 440 may be transmitted to a receiving node.

In the modulation process of the modulator 400, the data symbols may be two-dimensionally spread or two-dimensionally and partially spread to the resources in the 2D domain. Here, '2D partial spreading' may mean that the data symbols are spread within a specific spreading resource group or spreading resource block in the 2D domain. Here, the specific spreading resource group or spreading resource block may include some resources or all resources in the 2D domain. Hereinafter, in the present disclosure, a 'resource block' may be a term referring to a 'spreading resource block' or a 'spreading resource group'.

A delay-Doppler or Doppler-delay domain may be considered as an exemplary embodiment of the first 2D domain, and a frequency (or subcarrier)-time (or multi-carrier symbol) domain or a time (or multi-carrier symbol)-frequency (or subcarrier) domain may be considered as an exemplary embodiment of the second 2D domain.

When performing transmissions in a multiple-input and multiple-output (MIMO) or multiple-input and single-output (MISO) scheme using multiple antenna ports, pre-processing for multiple antenna transmission may be performed between the first mapper 410 and/or the pre-processor 420 and the second mapper 430. In the former case, the operation of the first mapper 410 may be performed for each antenna port that is an output of pre-processing for multi-antenna transmission. In the latter case, the operations of the first mapper 410 and the pre-processor 420 may be performed for each layer that is an input of pre-processing for multi-antenna transmission, and after the pre-processing for multi-antenna transmission is performed, the operations of the second mapper 430 and the modulator 440 may be performed for each antenna port that is the output of pre-processing for multi-antenna transmission. Technical features related to the modulation operation and calculation in the modulator 400 will be described in more detail below with reference to FIG. 5.

Figure 5:
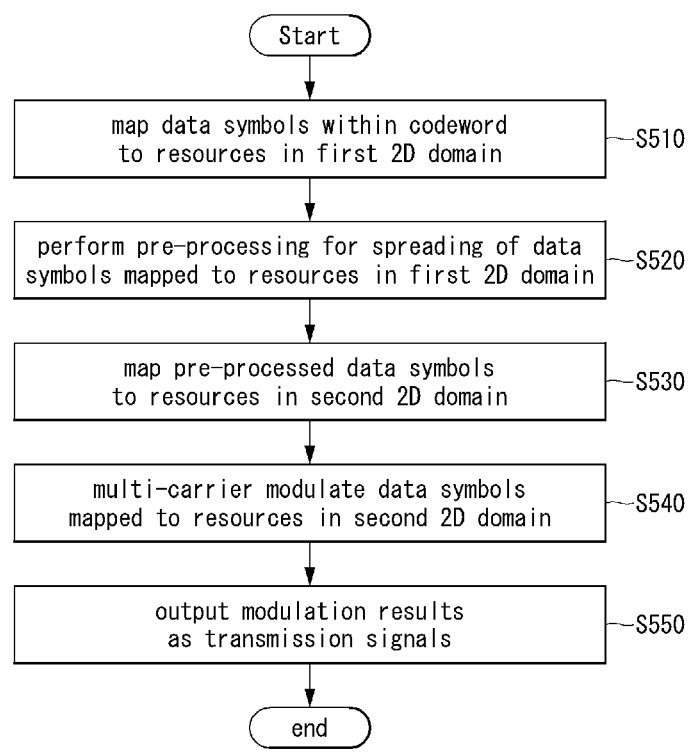
FIG. 5 is a flowchart illustrating an exemplary embodiment of a modulation method in a communication system.

FIG. 5 is a flowchart illustrating an exemplary embodiment of a modulation method in a communication system.

Referring to FIG. 5, a transmitting node in a communication system may include a modulator. Here, the modulator of the transmitting node may be the same as or similar to the modulator 400 described with reference to FIG. 4. The modulator may receive a codeword generated from a TB through a process such as encoding, or data symbols within the codeword. The transmitting node may modulate the codeword or the data symbols within the codeword input to the modulator through the modulator. In other words, the modulator of the transmitting node may output transmission signals by modulating the input codeword or data symbols within the codeword. In an exemplary embodiment of the communication system, the modulator may include components such as a first mapper, a pre-processor, a second mapper, and a multi-carrier modulator. However, this is only an example for convenience of description, and exemplary embodiments of the present disclosure are not limited thereto.

The modulation process of data symbols constituting one codeword is as follows. Data symbols within one codeword may be mapped to $N_G$ 2D spreading resource blocks (including a case where $N_G$ is 1) in the first 2D domain. In order to spread data symbols mapped to each 2D spreading resource block in the first 2D domain to resources in each corresponding 2D spreading resource block in the second 2D domain, pre-processing may be performed on the corresponding data symbols for each spreading resource block in the first 2D domain. As an example of the pre-processing, only discrete symplectic Fourier transform (DSFT) (or discrete Fourier transform (DFT) for the first dimension and inverse DFT (IDFT) for the second dimension), or the DSFT and subsequent TX windowing may be performed. As another example of the pre-processing, only Walsh-Hadamard transform (WHT) for the first dimension and inverse WHT (IWHT) for the second dimension, or the WHT and subsequent TX windowing may be performed. The data symbols pre-processed for each spreading resource block in the first 2D domain may be mapped to resources in each corresponding spreading resource block in the second 2D domain. Multi-carrier modulation may be performed on the data symbols spread on resources in the second 2D domain.

The first 2D domain may be defined as a delay-Doppler domain, a Doppler-delay domain, or another 2D domain. Hereinafter, for convenience, description will be made based on the delay-Doppler domain (the first dimension within the first 2D domain corresponds to a delay domain and the second dimension within the first 2D domain corresponds to a Doppler domain).

The second 2D domain may be defined as a frequency-time domain, a time-frequency domain, or another 2D domain. Hereinafter, for convenience, description will be made based on the frequency-time domain (the first dimension within the second 2D domain corresponds to a frequency domain and the second dimension within the second 2D domain corresponds to a time domain).

Different spreading resource blocks in the first 2D domain may have different independent resource grids. Different spreading resource blocks in the second 2D domain may share a common grid. Each spreading resource block in the first 2D domain may correspond to a different spreading resource block in the second 2D domain. The size of each spreading resource block in the first 2D domain may be the same as the size of each corresponding spreading resource block in the second 2D domain. The spreading resource blocks in the first 2D domain may be given sequential indices, and data symbols may be sequentially mapped in the order of spreading resource block indices. When the size of the spreading resource block is K, the first K data symbols are sequentially mapped to the 0-th spreading resource block, the next K data symbols are sequentially mapped to the next 1st spreading resource block, and data symbol mapping for the following spreading resource blocks may be performed in the same manner according to the order of the spreading resource block indices. Such the mapping rule may be defined in advance.

When mapping data symbols within each spread resource block in the first 2D domain, they may be mapped first to a delay axis and then to a Doppler axis. Alternatively, they may be mapped first to the Doppler axis and then to the delay axis. Such a mapping rule may be defined in advance or the base station may configure a rule to be applied to the terminal.

When mapping the spreading resource blocks in the first 2D domain to resources in the second 2D domain, they may be mapped first to a frequency axis and then to a time axis (This has an advantage of having a relatively small processing delay). Alternatively, when mapping the spreading resource blocks in the first 2D domain to resources in the second 2D domain, they may be mapped first to the time axis and then to the frequency axis. Such a mapping rule may be defined in advance or the base station may configure a rule to be applied to the terminal.

As the multi-carrier modulation, modulation such as CP-OFDM, W-OFDM (or PS-OFDM), and F/SBF-OFDM may be applied. The data symbols or the spread data symbols may be transmitted as being multiplexed with reference signals in the first 2D domain and the second 2D domain.

Specifically, the codeword or data symbols within the codeword may be input to the modulator of the transmitting node. The modulator may map the data symbols within the codeword to resources in the first 2D domain (S510). The operation according to the step S510 may be performed by the first mapper 410 described with reference to FIG. 4. The modulator may perform pre-processing for spreading the data symbols mapped to the resources in the first 2D domain to resources in the second 2D domain (S520). The operation according to the step S520 may be performed by the pre-processor 420 described with reference to FIG. 4. The modulator may map the pre-processed data symbols to resources in the second 2D domain (S530). The operation according to the step S530 may be performed by the second mapper 430 described with reference to FIG. 4. The modulator may multi-carrier-modulate the data symbols mapped to the resources in the second 2D domain for each of resources or resource blocks in the second 2D domain. The operation according to the step S540 may be performed by the multi-carrier modulator 440 described with reference to FIG. 4.

Specifically, the modulator may map only the data symbols to the resources in the first 2D domain, and may further map additional signals other than the data symbols to the resources in the first 2D domain. For example, one or more reference signals (RSs) or one or more symbols corresponding to the one or more RSs may be mapped to some of the resources in the first 2D domain instead of data symbols. Alternatively, one or more demodulation reference signals (DMRSs) or one or more symbols corresponding to the one or more DMRSs may be mapped to some of the resources in the first 2D domain instead of data symbols. Meanwhile, some of the resources in the first 2D domain may be vacated without mapping in consideration of interference between resources in the first 2D domain. Alternatively, guard resources may be disposed on some of the resources in the first 2D domain. The mapping operation for the resources in the first 2D domain according to the step S510 will be described in more detail below with reference to FIG. 6.

FIG. 6 is a conceptual diagram illustrating exemplary embodiments of a data symbol and reference signal (RS) mapping scheme for resources in a first 2D domain in a communication system.

Referring to FIG. 6, in an exemplary embodiment of the communication system, a first communication node may modulate a signal to be transmitted to a second communication node. Here, the first communication node may be the same as or similar to the transmitting node 310 described with reference to FIG. 3. The second communication node may be the same as or similar to the receiving node 320 described with reference to FIG. 3. The first communication node may modulate a codeword output by an encoder as a result of operation on a TB through a modulator. Here, the modulator may be the same as or similar to the modulator 400 described with reference to FIG. 4. Here, the modulator of the first communication node may map data symbols constituting the codeword to resources in the first 2D domain in the process of performing the modulation operation. The modulator of the first communication node may map one or more RSs to resources in the first 2D domain in addition to data symbols.

The first example of FIG. 6 may refer to a mapping scheme in which one RS is mapped to a centrally located resource and data symbols are mapped to the remaining resources. The second example of FIG. 6 may refer to a mapping scheme in which one RS is mapped to a centrally located resource, mapping is not performed on eight resources (null resources) surrounding the centrally located resource, and data symbols are mapped to the remaining resources. The third example of FIG. 6 may refer to a mapping scheme in which RSs are mapped to nine centrally located resources and data symbols are mapped to the remaining resources.

In case of transmitting symbols mapped or spread to different resource blocks in the second 2D domain (to be described in detail below), channels experienced by the respective resource blocks in the second 2D domain are different, so RS(s) may need to be transmitted in resource(s) in the first 2D domain corresponding to each block.

Since resources in the first 2D domain that are spread on different resource blocks in the second 2D domain may be de-spread as separated in the second 2D domain, it may be advantageous that the symbols spread on different resource blocks in the second 2D domain are contiguously allocated to resources in the first 2D domain. On the other hand, since data symbols transmitted in resources in the first 2D domain that are spread in the same resource block in the second 2D domain may interfere with each other due to channel spreading in the first 2D domain, it may be advantageous to allocate them as far apart as possible. Accordingly, it may be preferable to map data symbols transmitted to a specific receiver as being spread within the same resource block in the second 2D domain are mapped to resources in the first 2D domain in an interleaved pattern.

Figure 7A:
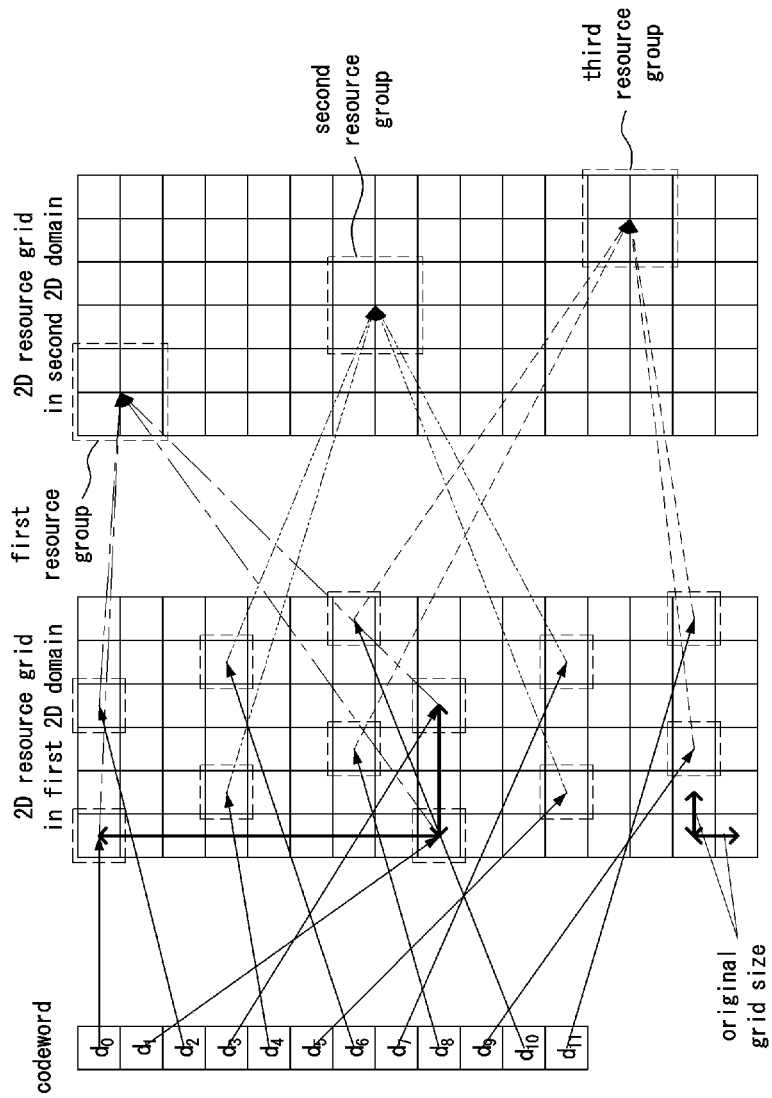
FIGS. 7A and 7B are conceptual diagrams for describing an exemplary embodiment of a relationship between data symbols, resources in a first 2D domain, and resources in a second 2D domain in a communication system.
Figure 7B:
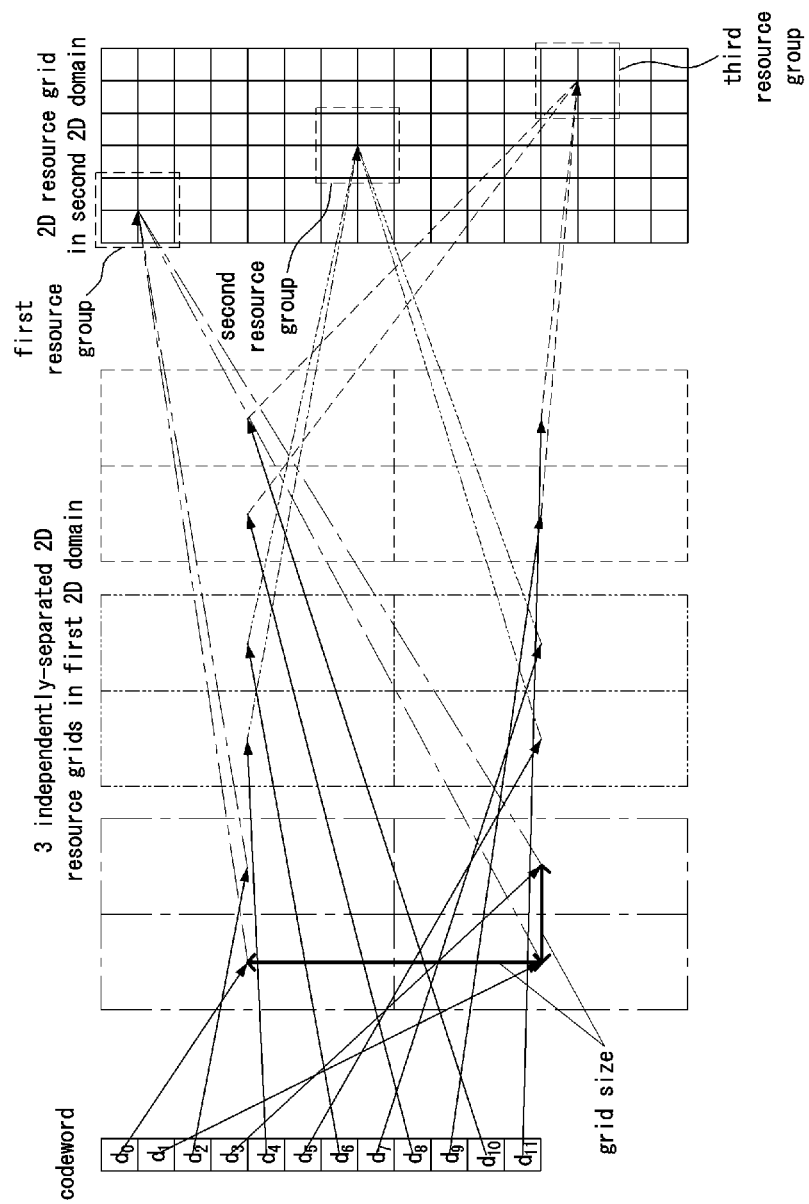

FIGS. 7A and 7B are conceptual diagrams for describing an exemplary embodiment of a relationship between data symbols, resources in a first 2D domain, and resources in a second 2D domain in a communication system.

FIG. 7A shows an example in which 12 data symbols within one codeword are mapped to 12 resources in a first 2D domain, and each group of 4 data symbols is spread into the same resource block in a second 2D domain. The four data symbols of each group, which are spread into the same resource block in the second 2D domain, may be mapped in an interleaved pattern to a resource grid in the first 2D domain. On the other hand, referring to FIG. 7B, it may be considered that symbols spread into different resource blocks in the second 2D domain are distributed and mapped to independently-separated grids (i.e., three grids) in the first 2D domain.

For multiple access of different users, data symbols for different users may be mapped without overlapping by dividing all resources in the first 2D domain. Additionally or alternatively, for multiple access of different users, data symbols for different users may be mapped without overlapping by dividing all resources in the second 2D domain. The latter case will be described in detail in description on an operation of the second mapper 130. In case of non-orthogonal multiple access, resources in the first 2D domain and/or resources in the second 2D domain may be mapped to different users by overlapping all or part of them.

Referring again to FIG. 5, the modulator may perform a modulation operation on each codeword. The modulated signal generated based on the modulation operation in the modulator may be represented by a modulation signal matrix S. The modulation signal matrix S may be expressed as Equation 1.

$$S|_{\overline{M} \times N} := \sum_{g \in [N_G]} S^{(g)} = G_T F_M^H \sum_{g \in [N_G]} M_f^{(g)} Y^{(g)} M_t^{(g)} \quad \text{[Equation 1]}$$

Referring to Equation 1, the modulation signal matrix S may have a size of $\overline{M} \times N$. Here, $\overline{M}$, which is the number of rows in the modulation signal matrix S, may mean the total number of subcarriers per a multi-carrier (MC) symbol. Alternatively, $\overline{M}$ may mean the size of FFT or the number of frequency domain resources. N, which is the number of rows in the modulation signal matrix S, may mean the number of multi-carrier symbols in a transmission time interval (TTI) or the number of time domain resources. $N_G$ may mean the number of resource blocks in the second 2D domain. $N_G$ may be 1 or a natural number greater than 1. $[N_G]$ may mean a set of resource blocks in the second 2D domain or a resource block set composed of resource blocks. $S^{(g)}$ may mean a matrix of a signal multi-carrier-modulated after being spread to resources in the g-th resource block in the second 2D domain.

In Equation 1, $Y^{(g)}$ may mean a matrix composed of symbols pre-processed after being mapped to resources in the g-th resource block in the first 2D domain. In Equation 1, $Y^{(g)}$ may correspond to an 'input matrix'. $M_f^{(g)}$ and $M_t^{(g)}$ may be matrixes for mapping the symbols pre-processed after being mapped to resources in the g-th resource block in the first 2D domain or the matrix $Y^{(g)}$ composed of the pre-processed symbols to resources in the first dimension and the second dimension of the g-th resource block in the second 2D domain, respectively. Here, the first dimension may mean a frequency domain, and the second dimension may mean a time domain.

Specifically, $Y^{(g)}$ may be the matrix composed of the symbols pre-processed after being mapped to resources in the g-th resource block in the first 2D domain. The size of the matrix $Y^{(g)}$ may correspond to $M_g \times N_g$. Here, $M_g$ may mean the number of delay domain resources (hereinafter, referred to as 'delay resources') in the g-th resource block in the first 2D domain. $N_g$ may mean the number of Doppler domain resources (hereinafter, referred to as 'Doppler resources') in the g-th resource block in the first 2D domain. $M_g$ and/or $N_g$ may have the same value or different values in each of the resource blocks in the first 2D domain. Hereinafter, an exemplary embodiment of a modulation method in a communication system will be described by taking the case where $M_g$ and $N_g$ have the same value in resource blocks in the first 2D domain as an example. However, this is only an example for convenience of description, and exemplary embodiment of the present disclosure are not limited thereto. $Y^{(g)}$ may be defined as $$Y^{(g)} (:= W_{T,f}^{(g)} F_{M_g} M_d^{(g)} X^{(g)} M_D^{(g)} F_{N_g}^H W_{T,t}^{(g)} \leftrightarrow \text{vec}$$
$$(Y^{(g)}) = ((M_D^{(g)} F_{N_g}^H W_{T,t}^{(g)})^T \otimes (W_{T,f}^{(g)} F_{M_g} M_d^{(g)}))$$
$$\text{vec}(X^{(g)})).$$

$M_f^{(g)}$ may mean a matrix for mapping symbols pre-processed after being mapped to resources in the g-th resource block in the first 2D domain to resources in the frequency dimension of the g-th resource block in the second 2D domain. The size of the matrix $M_{f(g)}$ may correspond to $\overline{M} \times M_g (\leq \overline{M})$. In Equation 1, $M_f^{(g)}$ may be multiplied on the left side of the input matrix $Y^{(g)}$. Here, when the matrix $M_f^{(g)}$ maps an element located in the $i(\in [M_g])$-th row of each column of the input matrix $Y^{(g)}$ to an element located in the $j(\in [\overline{M}])$-th row of each column of the output matrix, $[M_f^{(g)}]_{j,i}$ among the elements of the matrix $M_f^{(g)}$ may have a value of 1, and other elements may have a value of 0.

$M_t^{(g)}$ may mean a matrix for mapping symbols pre-processed after being mapped to resources in the g-th resource block in the first 2D domain to resources in the time dimension of the g-th resource block in the second 2D domain. The size of the matrix $M_t^{(g)}$ may correspond to $N_g(\leq N) \times N$. In Equation 1, $M_t^{(g)}$ may be multiplied on the right side of the input matrix $Y^{(g)}$. Here, when the matrix $M_t^{(g)}$ maps an element located in the $i \in [N_g]$-th row of each row of the input matrix $Y^{(g)}$ to an element located in the $j \in [N]$-th column of each column of the output matrix, $[M_t^{(g)}]_{i,j}$ among the elements of the matrix $M_t^{(g)}$ may have a value of 1, and other elements may have a value of 0.

In Equation 1, $G_T$ may mean a transmission pulse shaping matrix having a size of $\overline{M}(\geq M) \times M$. The transmission pulse shaping function by $G_T$ may include a cyclic prefix (CP) insertion function, and/or an oversampling function. When the transmission pulse shaping function by $G_T$ includes the CP insertion function and/or the oversampling function, $\overline{M} > M$ may be established. When the transmission pulse shaping function by $G_T$ includes the CP insertion function, the length of the inserted CP may be defined as $M_{CP}(:= \overline{M} - M)$. For example, when the transmission pulse shaping function by $G_T$ includes the CP insertion function and a square pulse is applied, $G_T$ may be expressed as in Equation 2.

$$G_T = \begin{bmatrix} 0_{M_{CP} \times (M - M_{CP})} & I_{M_{CP}} \\ I_M & \end{bmatrix} \quad \text{[Equation 2]}$$

In Equation 1, $F_M^H$ may mean a column vector or an M-point inverse discrete Fourier transform (IDFT) matrix for each column vector constituting a matrix.

In Equation 1, $\Sigma_{g \in [N_G]} M_f^{(g)} Y^{(g)} M_t^{(g)}$ may mean that symbols pre-processed after being mapped to resources in each resource block in the second 2D domain are mapped to resources in each corresponding resource block in the second 2D domain. In Equation 1, the multiplication of $G_T F_M^H$ and $\Sigma_{g \in [N_G]} M_f^{(g)} Y^{(g)} M_t^{(g)}$ may mean that the symbols mapped to the resources in the resource block in the second 2D domain are commonly multi-carrier-modulated. In other words, the multiplication of $G_T F_M^H$ and $\Sigma_{g \in [N_G]} M_f^{(g)} Y^{(g)} M_t^{(g)}$ may mean that IFFT (or IDFT) and transmission pulse shaping are performed on the symbols mapped to the resources in the resource block in the second 2D domain.

The modulation signal matrix S may be vectorized and expressed as a vector s as shown in Equation 3.

$$s = \text{vec}(S) = [s_0^T s_1^T \ldots s_{N-1}^T]^T \quad \text{[Equation 3]}$$

The modulation signal vector s to which the modulation signal matrix S is vectorized may be expressed as in Equation 4.

$$s = bdiag(T^{(0)}, T^{(1)}, \ldots, T^{(N_G-1)})x = \sum_{g \in [N_G]} T^{(g)} x^{(g)} \quad \text{[Equation 4]}$$

In Equation 4, $x^{(g)}$ may correspond to the codeword input to the modulator. Specifically, $x^{(g)}$ may mean a sub-vector corresponding to the data symbols mapped to the resources in the g-th resource block in the first 2D domain among sub-vectors constituting a codeword vector x. Meanwhile, in Equation 4, $bdiag(T^{(0)}, T^{(1)}, \ldots, T^{(N_G-1)})$ may mean a block diagonal matrix for which each diagonal submatrix is configured as $T^{(g)}$. For example, $bdiag(T^{(0)}, T^{(1)}, \ldots, T^{(N_G-1)})$ may be expressed as in Equation 5.

$$bdiag(T^{(0)}, T^{(1)}, \ldots, T^{(N_G-1)}) = \begin{bmatrix} T^{(0)} & & & \\ & T^{(1)} & & \\ & & \ddots & \\ & & & T^{(N_G-1)} \end{bmatrix} \quad \text{[Equation 5]}$$

That is, $bdiag(T^{(0)}, T^{(1)}, \ldots, T^{(N_G-1)})$ may represent a relationship between the codeword vector x input to the modulator and the modulation signal vector s. In other words, $bdiag(T^{(0)}, T^{(1)}, \ldots, T^{(N_G-1)})$ may be regarded as a term expressing all operations performed by the modulator to obtain the modulation signal vector s through the multi-carrier-modulation on the codeword vector x. In addition, each of $T^{(g)}$ constituting $bdiag(T^{(0)}, T^{(1)}, \ldots, T^{(N_G-1)})$ may be regarded as a term expressing all operations performed to modulate each x(g) constituting the codeword vector x.

The steps S510 to S550 or the functional blocks corresponding to the respective steps constituting the modulation process performed by the modulator are expressed in form of matrix operations or vector operations such as Equations 1 to 5. However, this is only an example for convenience of description, and exemplary embodiments of the present disclosure are not limited thereto. For example, the respective functions of the modulation process performed by the modulator may be implemented as operation schemes other than matrix operations or vector operations. The matrix operations or vector operations, such as Equations 1 to 5, may be viewed as simple mathematical expressions of effects of functions between input and output of the respective functional blocks. For example, a product with a DFT matrix may be treated as an FFT, and a product with an IDFT matrix may be treated as an IFFT. A product with the transmission pulse shaping matrix $G_T$ may be performed as multiplying time samples of the modulation signal obtained via FFT or IFFT with respective corresponding coefficients of a pulse. When the function of the transmission pulse shaping matrix includes the CP insertion and/or oversampling, the transmission pulse shaping may be performed by iteratively expanding each time sample. The resource mapping operation may be processed by indexing or mapping rather than the matrix operation.

Figure 8:
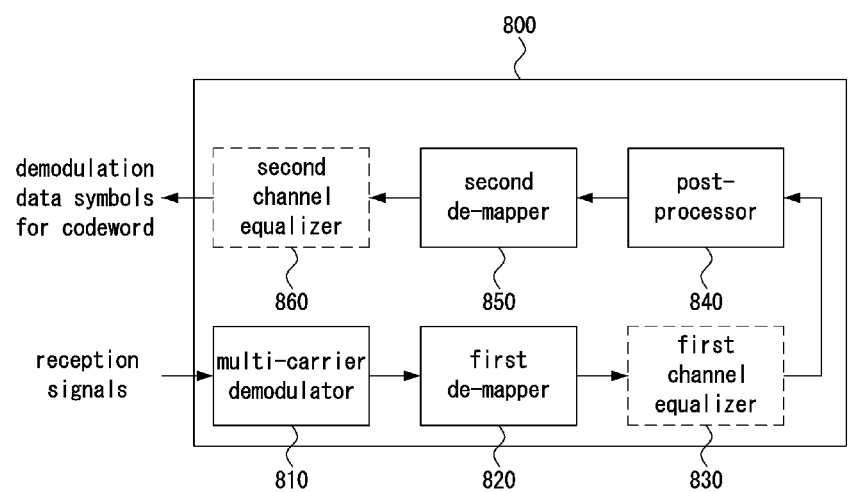
FIG. 8 is a block diagram illustrating an exemplary embodiment of a demodulator of a receiving node in a communication system.

FIG. 8 is a block diagram illustrating an exemplary embodiment of a demodulator of a receiving node in a communication system.

Referring to FIG. 8, a receiving node in a communication system may include a demodulator 800. Here, the demodulator may be the same as or similar to the demodulator 322 of the receiving node 310 described with reference to FIG. 3. The demodulator 800 may receive information on reception signals received through a radio channel, which are radio signals modulated and transmitted by a transmitting node of the communication system. The demodulator 800 may output demodulation data symbols by demodulating the reception signals received through the radio channel. The demodulation data symbols may constitute a demodulated codeword that is a result of restoration of the codeword to be transmitted by the transmitting node. In an exemplary embodiment of the communication system, the demodulator 800 may include components such as a multi-carrier demodulator 810, a first de-mapper 820, a post-processor 840, and a second de-mapper 850. The demodulator 800 may further include a first channel equalizer 830 and a second channel equalizer 860. However, this is only an example for convenience of description, and exemplary embodiments of the present disclosure are not limited thereto.

The multi-carrier demodulator 810 may receive information on the reception signals received through the radio channel. The multi-carrier demodulator 810 may perform multi-carrier demodulation on the reception signals for each resource in the second 2D domain. Here, the multi-carrier demodulation on the reception signals for each resource in the second 2D domain may mean that multi-carrier demodulation is performed for each OFDM symbol. The multi-carrier demodulator 810 may output information on the multi-carrier demodulation signals. The multi-carrier demodulation signals output from the multi-carrier demodulator 810 may be mapped to resources in a total of $N_G$ resource blocks in the second 2D domain.

The signals output from the multi-carrier demodulator 810 may be input to the first de-mapper 820. The first de-mapper 820 may perform de-mapping on the demodulation signals mapped to the resources in the total of $N_G$ resource blocks in the second 2D domain. The de-mapped signals may be input to the post-processor 840. Alternatively, the de-mapped signals may be input to the post-processor 840 after being channel-equalized by the first channel equalizer 830.

The post-processor 840 may perform a post-processing operation for each resource block on the signals de-mapped from the total of $N_G$ resource blocks in the second 2D domain or the signals channel-equalized after the de-mapping. The signals post-processed by the post-processor 840 may be considered to have the same as or similar state when mapped to the resource blocks in the first 2D domain. The signals that have undergone the post-processing operation in the post-processor 840 may be input to the second de-mapper 850.

The second de-mapper 850 may perform de-mapping on the signals mapped to the respective resource blocks in the first 2D domain. The second de-mapper 850 may output data symbols de-mapped from the resource blocks in the first 2D domain as a result of the de-mapping operation. The data symbols output from the second de-mapper 850 may be output from the demodulator 800 as a result of all demodulation operations performed by the demodulator 800. Alternatively, the data symbols output from the second de-mapper 850 may be output from the demodulator 800 after being channel-equalized by the second channel equalizer 860.

The receiving node may obtain a codeword based on the data symbols output from the demodulator 800. The obtained codeword may be regarded as corresponding to the codeword generated based on information such as data to be transmitted by the transmitting node. Technical features related to the demodulation operations or calculations in the demodulator 800 will be described in more detail below with reference to FIG. 9.

Figure 9:
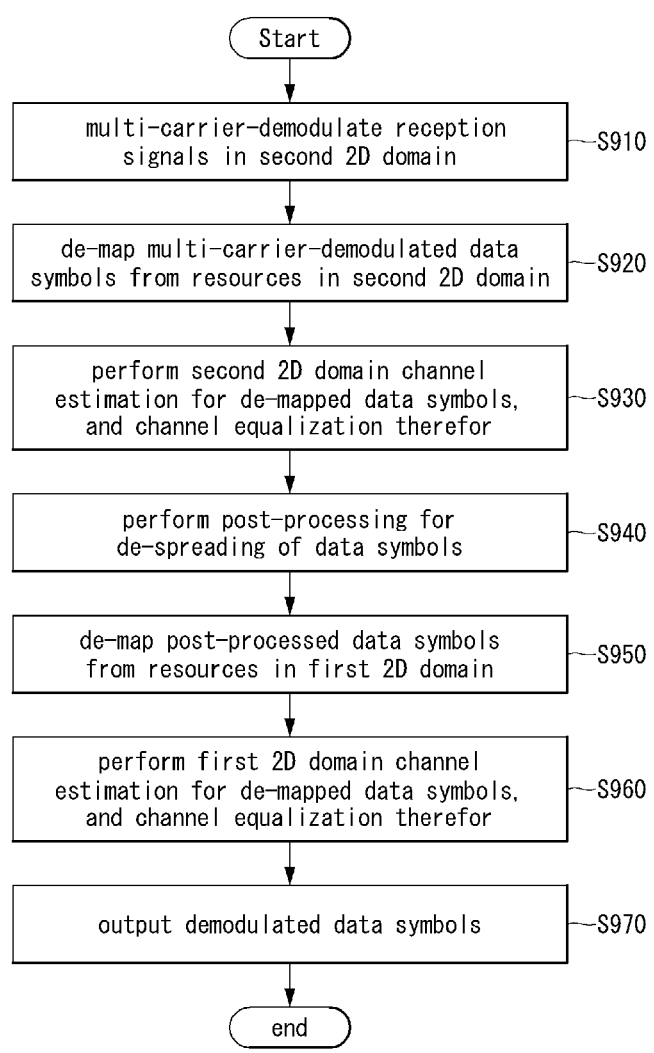
FIG. 9 is a flowchart illustrating an exemplary embodiment of a multi-carrier demodulation method in a communication system.

FIG. 9 is a flowchart illustrating an exemplary embodiment of a multi-carrier demodulation method in a communication system.

Referring to FIG. 9, a receiving node in a communication system may include a demodulator. Here, the demodulator of the receiving node may be the same as or similar to the demodulator 800 described with reference to FIG. 8. The demodulator may receive information on radio signals received through a radio channel. The demodulator may perform a demodulation operation based on the input information on the radio signals. In other words, the demodulator may output data symbols by demodulating the radio signals received by the receiving node. In an exemplary embodiment of the communication system, the demodulator may include components such as a multi-carrier demodulator, a first de-mapper, a post-processor, and a second de-mapper. In an exemplary embodiment of the communication system, the demodulator may further include components such as a first channel equalizer and a second channel equalizer. However, this is only an example for convenience of description, and exemplary embodiments of the present disclosure are not limited thereto.

In order to demodulate the reception signals, it may be required to adjust a time and frequency synchronization between a transmitter and a receiver to a certain level or more. In addition, a process for synchronization in a level of a mini-slot, a half-slot, a slot, a frame, and/or a super-frame may be needed. In the present disclosure, it is assumed that such the synchronization is acquired through a synchronization process prior to the demodulation operation.

The information on the radio signals received through the radio channel may be input to the demodulator of the receiving node. Here, the radio channel may be a time-variant or time varying channel. Alternatively, it may be a non-time-variant (or static) channel. The radio channel may be a multi-path channel. Alternatively, the radio channel may be a single path channel. The time-variant channel may refer to a channel that may change with time. The time-variant channel may include a non-time-variant channel as a specific part thereof. Meanwhile, the multi-path channel may mean a 'channel including one or more paths'. The multi-path channel may include a single path channel as a special part thereof. Hereinafter, a term 'time-variant multi-path channel' may be an expression including a case in which the channel is a non-time-variant channel or a single-path channel, unless otherwise defined.

The reception signals received through the radio channel may be expressed as Equation 6.

$$r_{n|n\in[N]} = H_n s_n + v_n \quad \text{[Equation 6]}$$

Equation 6 may mean information on each of N multi-carrier symbols within one TTI. The symbols constituting a multi-carrier may be assumed to be sufficiently spaced apart so that inter-symbol interference (ISI) does not occur. n may mean an index of each multi-carrier symbol, and may have a value from 1 to N. $r_n$ may mean a reception signal vector for the n-th multi-carrier symbol among the N multi-carrier symbols. The N reception signal vectors may configure a reception signal matrix $R=[r_0 \, r_1 \, \ldots \, r_{N-1}]$. $H_n$ may be a matrix representing information of the radio channel. Here, $H_n$ may correspond to a linear time-variant convolution matrix to which information of a time-variant multi-path channel is reflected. In a time-variant channel, non-zero diagonal components representing channel information may not have a constant value. In case that $\tilde{M}=\overline{M}+L_H-1$, $H_n$ may have a size of $\tilde{M}\times\overline{M}$. $L_H$ may mean the maximum delay length index based on a case in which the first delay index is 1. $s_n$ may correspond to information of the radio signals transmitted from the transmitting node. $w_{T,t,n}^{(g)}=[W_{T,t}^{(g)}]_{n,n}$ may mean the n-th diagonal component of $W_{T,t}^{(g)}$.

$v_n$ may correspond to a noise vector in the n-th multi-carrier symbol. For example, when noise generated during the transmission process in the radio channel is white Gaussian noise, $v_n$ may have statistics of $E=[v_n v_n^H]=n_0 I_{\tilde{M}}$.

The demodulator may perform multi-carrier demodulation on the signals received through multi-carrier symbols (S910). The demodulator may perform a multi-carrier demodulation operation on the reception signals in the second 2D domain. The multi-carrier demodulation operation in the step S910 may be performed by the multi-carrier demodulator 810 described with reference to FIG. 8. The multi-carrier demodulation operation in the step S910 may correspond to a reverse operation of the multi-carrier modulation operation according to the step S540 described with reference to FIG. 5. The demodulator may perform a multi-carrier demodulation operation according to a scheme such as CP-OFDM, W-OFDM (or PS-OFDM), or F/SBF-OFDM.

Through the multi-carrier demodulation operation in the step S910, data symbols mapped to resources in a total of $N_G$ resource blocks in the second 2D domain may be obtained. The demodulator may de-map the multi-carrier demodulated data symbols from the resources in the second 2D domain (S920). The de-mapping operation performed in the step S920 may be performed by the first de-mapper 820 described with reference to FIG. 8.

The de-mapping operation performed in the step S920 may correspond to a reverse operation of the mapping operation performed in the step S530 described with reference to FIG. 5.

The signals or data symbols obtained through the steps S910 and S920 may be expressed by a matrix $\tilde{Y}^{(g)}$ as in Equation 7.

$$\tilde{Y}^{(g)}|_{g\in[N_g]} = (M_f^{(g)})^T F_M G_R R (M_t^{(g)})^T \qquad \text{[Equation 7]}$$

$\tilde{Y}^{(g)}$ expressed as in Equation 7 may be expressed in form of a vector as in Equation 8.

$$\text{vec}(\tilde{Y}^{(g)})|_{g\in[N_g]} = (M_t^{(g)} \otimes ((M_f^{(g)})^T F_M G_R)) \text{vec}(R) \qquad \text{[Equation 8]}$$

In Equations 7 and 8, $G_R$ may mean a reception pulse shaping matrix having a size of M×M̃. $G_R$ may correspond to the transmission pulse shaping matrix $G_T$ described with reference to FIG. 5. The reception pulse shaping function by $G_R$ may include a CP removal function and/or a down-sampling function. For example, the reception pulse shaping function may include the CP removal function. The reception pulse shaping function may include a function of removing samples received as being delayed by a channel delay in applying a square pulse. According to the reception pulse shaping function, a CP having a length of $M_{CP}$ is removed, the last $L_H-1$ time samples received as being delayed by the channel delay are removed, and when a square pulse is applied, $G_R$ may be expressed as in Equation 9.

$$G_R = [O_{M\times M_{CP}} I_M O_{M\times(L_H-1)}] \qquad \text{[Equation 9]}$$

The demodulator may perform a second 2D domain channel estimation for data symbols de-mapped from the resources in the second 2D domain through the step S920 and a channel equalization operation thereon (S930). The channel estimation and channel equalization operations performed in the step S930 may be performed by the first channel equalizer 830 described with reference to FIG. 8. Here, the operation according to the step S930 may be selectively performed. For example, the demodulator may perform a post-processing operation for de-spreading the data symbols de-mapped from the resources in the second 2D domain in the step S920 (S940). Hereinafter, an exemplary embodiment of a multi-carrier demodulation method in the communication system will be described by taking a case in which the demodulator performs the step S940 without performing the step S930 as an example. An exemplary embodiment in which the demodulator performs the step S930 will be described later.

The demodulator may perform multi-carrier demodulation, de-mapping, and second 2D domain channel equalization (when necessary) in the second 2D domain, and perform post-processing for each of a total of $N_G$ resource blocks in the first 2D domain by using the result as an input. For example, the post-processing may be performed as RX windowing and subsequent inverse DSFT (IDSFT) (or, IDFT for the first dimension and DFT for the second dimension) or only IDSFT without RX windowing. As another example, the post-processing may be performed as RX windowing and subsequent IWHT for the first dimension and WHT for the second dimension, or IWHT for the first dimension and WHT for the second dimension without RX windowing. Then, de-mapping from the resources in each spreading resource block in the first 2D domain may be performed.

The demodulator may perform the post-processing operation for each resource block, on data symbols de-mapped from a total of $N_G$ resource blocks in the second 2D domain (S940). The post-processing operation in the step S940 may be performed by the post-processor 840 described with reference to FIG. 8. The post-processing operation in the step S940 may correspond to a reverse operation of the pre-processing operation in the step S520 described with reference to FIG. 5.

The data symbols that have undergone the post-processing operation in the step S940 may be considered to have the same or similar state mapped to the resource blocks in the first 2D domain. The demodulator may de-map the post-processed data symbols from the resources in the first 2D domain (S950). The de-mapping operation in the step S950 may be performed by the second de-mapper 850 described with reference to FIG. 8. The de-mapping operation in the step S950 may correspond to a reverse operation of the mapping operation in the step S510 described with reference to FIG. 5.

The signals or data symbols obtained through the steps S910 and S920 may be expressed as a matrix $\tilde{X}^{(g)}$ as in Equation 10.

$$\tilde{X}^{(g)}|_{g\in[N_g]} = (M_d^{(g)})^T F_{M_g}^H W_{R,f}^{(g)} \tilde{Y}^{(g)} W_{R,t}^{(g)} F_{N_g}(M_D^{(g)}) \qquad \text{[Equation 10]}$$

In Equation 10, $\tilde{X}^{(g)}$ may correspond to a demodulation signal matrix. The demodulation signal matrix $\tilde{X}^{(g)}$ may have a size of $M'_g \times N'_g$. $W_{R,f}^{(g)}$ and $W_{R,t}^{(g)}$ may mean RX windowing matrices in the first dimension and the second dimension for the g-th resource block in the first 2D domain, respectively. The first dimension may mean a delay domain, and the second dimension may refer to a Doppler domain. Specifically, $W_{R,f}^{(g)}$ and $W_{R,t}^{(g)}$ may be diagonal matrices. Each of diagonal elements constituting the diagonal matrix $W_{R,f}^{(g)}$ may correspond to a reception window coefficient in the first dimension of the first 2D domain. In the second dimension of the first 2D domain, the length of the reception window may be $M_g$, and the size of $W_{R,f}^{(g)}$ may be $M_g \times M_g$. Each of diagonal elements constituting the diagonal matrix $W_{R,t}^{(g)}$ may correspond to each reception window coefficient in the second dimension of the first 2D domain. Here, the length of the reception window in the second dimension of the first 2D domain may be $N_g$, and the size of $W_{R,t}^{(g)}$ may be $N_g \times N_g$.

$M_f^{(g)}$ may mean a matrix for mapping symbols pre-processed after being mapped to the resources in the g-th resource block to resources in the frequency dimension of the g-th resource block of the second 2D domain. The size of the matrix $M_f^{(g)}$ may correspond to $M \times M_g (\leq M)$. In Equation 1, $M_f^{(g)}$ may be multiplied on the left side of the input matrix $Y^{(g)}$. Here, when the matrix $M_f^{(g)}$ maps an element located in the $i \in [M_g]$-th row of each column of the input matrix $Y^{(g)}$ to an element located in the $j \in [M]$-th row of each column of the output matrix, $[M_f^{(g)}]_{j,i}$ among the elements of the matrix $M_f^{(g)}$ may have a value of 1, and other elements may have a value of 0.

$\tilde{X}^{(g)}$ expressed as in Equation 10 may be expressed in form of a vector as in Equation 11 and/or Equation 12.

$$\text{vec}(\tilde{X}^{(g)})|_{g \in [N_g]} := ((W_{R,t}^{(g)} F_{N_g} (M_D^{(g)})^T)^T \otimes ((M_d^{(g)})^T F_{M_g}^H W_{R,f}^{(g)})) \text{vec}(\tilde{Y}^{(g)}) \quad \text{[Equation 11]}$$

$$\text{vec}(\tilde{X}^{(g)})|_{g \in [N_g]} := T_R^{(g)} \text{vec}(R) \quad \text{[Equation 12]}$$

In Equation 12, $T_R^{(g)}$ may be regarded as a term expressing all operations performed to demodulate a vector $\text{vec}(R)$ of the reception signals. $T_R^{(g)}$ may be defined as in Equation $$T_R^{(g)} = \left((W_{R,t}^{(g)} F_{N_g} (M_D^{(g)})^T)^T \otimes ((M_d^{(g)})^T F_{M_g}^H W_{R,f}^{(g)})\right) \quad \text{[Equation 13]}$$

$$\left(M_t^{(g)} \otimes ((M_f^{(g)})^T F_M G_R)\right) =$$

$$\left(((M_t^{(g)})^T W_{R,t}^{(g)} F_{N_g} (M_D^{(g)})^T)^T \otimes \right.$$

$$\left. ((M_d^{(g)})^T F_{M_g}^H W_{R,f}^{(g)} (M_f^{(g)})^T F_M G_R)\right)$$

The demodulator may obtain data symbols de-mapped from the resources in the first 2D domain by performing the steps S940 and S950. The demodulator may perform first 2D domain channel estimation for data symbols de-mapped from the resources in the first 2D domain, and a channel equalization operation thereon (S960). The channel estimation and channel equalization operations performed in the step S960 may be performed by the second channel equalizer 860 described with reference to FIG. 8. Here, the operation according to the step S960 may be selectively performed. For example, the demodulator may output data symbols de-mapped from the resources in the first 2D domain through the steps S940 and S950 as a result of the demodulation operation in the demodulator (S970). Hereinafter, an exemplary embodiment of a multi-carrier demodulation method in the communication system will be described by taking a case in which the demodulator performs the step S970 without performing the step S960 as an example. An exemplary embodiment in which the demodulator performs the step S960 will be described later.

The demodulator may output data symbols de-mapped from the resources in the first 2D domain, such as the demodulation signal matrix $\tilde{X}^{(g)}$, as a result of the demodulation operation in the demodulator (S970). The receiving node may obtain a codeword based on the data symbols output in the step S970. The obtained codeword may be regarded as corresponding to the codeword generated based on information such as data to be transmitted by the transmitting node.

Linear Channel Equalization in Second 2D Domain

Hereinafter, a first exemplary embodiment of the channel equalization operation in the second 2D domain according to the step S930 will be described. In an exemplary embodiment of the communication system, the demodulator may perform a channel equalization operation in the second 2D domain for data symbols de-mapped from the resources in the second 2D domain in the step S920 (S930). Here, the channel equalization operation according to the step S930 may correspond to a linear channel equalization operation or a 1-tap channel equalization operation.

Specifically, the demodulator may obtain a multi-carrier demodulated and de-mapped signal matrix $\tilde{Y}^{(g)}$ for the g-th resource block in the second 2D domain through the steps S910 and S920. The demodulator may perform channel equalization on the matrix $\tilde{Y}^{(g)}$ in the step S930. The output matrix $\hat{Y}^{(g)}$ subjected to the channel equalization may be expressed as Equation 14.

$$\hat{Y}^{(g)}|_{g \in [N_g]} = E_{TF}^{(g)} \odot \tilde{Y}^{(g)} \quad \text{[Equation 14]}$$

In Equation 14, $E_{TF}^{(g)}$ may be a first channel equalization matrix corresponding to the channel equalization operation according to the step S930. The operator '$\odot$' may mean a multiplication operation between elements located in the same row and column of two matrices. $\hat{Y}^{(g)}$ may be a matrix obtained through a multiplication operation between elements located in the same row and column of $E_{TF}^{(g)}$ and $\tilde{Y}^{(g)}$. $\hat{Y}^{(g)}$ may be an output matrix corresponding to a result of the channel equalization operation according to the step S930. In the first exemplary embodiment of the channel equalization operation in the second 2D domain, the first channel equalization matrix $E_{TF}^{(g)}$ may be defined as Equation 15 or Equation 16.

$$E_{TF}^{(g)} = (\tilde{H}_{TF}^{(g)})^{\circ -1} \quad \text{[Equation 15]}$$

$$E_{TF}^{(g)} = (\tilde{H}_{TF}^{(g)})^* \odot (\tilde{H}_{TF}^{(g)} \odot (\tilde{H}_{TF}^{(g)})^* + \tilde{Z}_{TF}^{(g)})^{\circ -1} \quad \text{[Equation 16]}$$

Equation 15 may be regarded as representing the definition of the first channel equalization matrix according to a 1-tap zero forcing (ZF) equalization scheme. Equation 16 may be regarded as representing the definition of the first channel equalization matrix according to a 1-tap minimum mean squared error (MMSE) equalization scheme. In Equations 15 and 16, $(\bullet)^{\circ -1}$ may mean an operation of taking an inverse of each element of a matrix. In Equation 16, $(\bullet)^*$ may mean an operation of taking a complex-conjugate for each element of a matrix.

In Equations 15 and 16, $\tilde{H}_{TF}^{(g)}$ may correspond to a first channel estimation information matrix. The first channel estimation information matrix $\tilde{H}_{TF}^{(g)}$ may be defined as in Equation 17.

$$\tilde{H}_{TF}^{(g)} = \text{vec}_{M_g \times N_g}^{-1}(\text{diag}^{-1}(\hat{H}_{TF}^{(g)})) \quad \text{[Equation 17]}$$

In Equation 17, $\text{vec}_{M_g \times N_g}^{-1}$ may mean an operation of converting the input vector $\text{diag}^{-1}(\hat{H}_{TF}^{(g)})$ to a matrix of $M_g \times N_g$. In Equation 16, $\tilde{Z}_{TF}^{(g)} := \text{vec}_{M_g \times N_g}^{-1}(\text{diag}^{-1}(\hat{Z}_{TF}^{(g)}))$ may be established, and $\hat{Z}_{TF}^{(g)} := \bar{n}_0 (M_t^{(g)} (M_t^{(g)})^T) \otimes ((M_f^{(g)})^T F_M G_R^{(g)} ((M_f^{(g)})^T F_M G_R^{(g)})^H)$ may be established. Here, $n_0$ is a variance (i.e., average power) of the noise, and in practice, an estimate thereof may be used.

Ideal channel estimation information used for the channel equalization may be defined as in Equation 18.

$$H_{TF}^{(g)} = (M_t^{(g)} \otimes ((M_{R,f}^{(g)})^T F_M G_R^{(g)})) \text{bdiag}(H_0, H_1, \ldots, H_{N-1}) ((M_t^{(g)})^T \otimes G_T^{(g)} F_M^H M_{T,f}^{(g)}) \quad \text{[Equation 18]}$$

Meanwhile, in an actual communication system, the demodulator may acquire channel estimation information $\hat{H}_{TF}^{(g)}$ based on actual measurement information for a predetermined reference signal. For example, the demodulator may obtain channel estimation information $\hat{H}_{TF}^{(g)}$ for each resource block based on one or more reference signals allocated to one or more resources in each resource block in the second 2D domain. Alternatively, the demodulator may perform channel estimation based on one or more reference signals allocated to one or more resources in each resource block in the first 2D domain, and may convert a result of the performed channel estimation into the channel estimation information $\hat{H}_{TF}^{(g)}$ in the second 2D domain. For example, it may be the same as or similar to Equation 19.

$$\hat{H}_{TF}^{(g)} = ((M_D^{(g)} F_{N_g}^H (W_{R,t}^{(g)})^{-1})^T \otimes ((W_{R,f}^{(g)})^{-1} F_{M_g} M_d^{(g)})) \hat{H}_{dD}^{(g)} (((W_{T,t}^{(g)})^{-1} F_{N_g} (M_D^{(g)})^T)^T \otimes ((M_d^{(g)})^T F_{M_g}^H (W_{T,f}^{(g)})^{-1}))$$ [Equation 19]

In Equation 19, $\hat{H}_{dD}^{(g)}$ may correspond to channel estimation information obtained based on one or more reference signals allocated to one or more resources in each resource block in the first 2D domain. That is, according to Equation 19, channel estimation information $\hat{H}_{dD}^{(g)}$ for each resource block obtained by measurement in the first 2D domain may be converted to the channel estimation information $\hat{H}_{TF}^{(g)}$ for each resource block in the second 2D domain. Alternatively, the demodulator may obtain the channel estimation information by using reference signals allocated to resources in the first and second 2D domains together.

In the step S930, the demodulator may perform a multicarrier demodulation operation and a channel equalization operation on de-mapped signals for each resource block in the second 2D domain based on the first exemplary embodiment of the channel equalization operation in the second 2D domain. In this case, the output matrix $\hat{Y}^{(g)}$ subjected to the channel equalization in the second 2D domain may replace the matrix $\tilde{Y}^{(g)}$ in the step S940 and subsequent steps. A post-processing operation according to the step S940 and a de-mapping operation according to the step S950 may be performed based on the output matrix $\hat{Y}^{(g)}$ subjected to the channel equalization in the second 2D domain. Data symbols may be obtained as a result of the post-processing and de-mapping performed based on the output matrix $\hat{Y}^{(g)}$ subjected to the channel equalization in the second 2D domain. Here, a log-likelihood ratio (LLR) for the coded bits of each data symbol may be calculated as in Equation 20.

$$L_{TF-EQ,k,j}^{(g)} = \hbar \sum_{\xi_i | b_{i,j}=1 \in \Xi} \exp\left(-\frac{|\hat{x}_{TF-EQ,k}^{(g)} - \hat{h}_{TF-EQ,k}^{(g)} \xi_i|^2}{(\sigma_{TF-EQ,k}^{(g)})^2}\right) -$$

$$\hbar \sum_{\xi_i | b_{i,j}=0 \in \Xi} \exp\left(-\frac{|\hat{x}_{TF-EQ,k}^{(g)} - \hat{h}_{TF-EQ,k}^{(g)} \xi_i|^2}{(\sigma_{TF-EQ,k}^{(g)})^2}\right) =$$

$$\max_{\xi_i | b_{i,j}=1 \in \Xi} * \left(-\frac{|\hat{x}_{TF-EQ,k}^{(g)} - \hat{h}_{TF-EQ,k}^{(g)} \xi_i|^2}{(\sigma_{TF-EQ,k}^{(g)})^2}\right) -$$

$$\max_{\xi_i | b_{i,j}=0 \in \Xi} * \left(-\frac{|\hat{x}_{TF-EQ,k}^{(g)} - \hat{h}_{TF-EQ,k}^{(g)} \xi_i|^2}{(\sigma_{TF-EQ,k}^{(g)})^2}\right) \approx$$

$$\max_{\xi_i | b_{i,j}=1 \in \Xi} \left(-\frac{|\hat{x}_{TF-EQ,k}^{(g)} - \hat{h}_{TF-EQ,k}^{(g)} \xi_i|^2}{(\sigma_{TF-EQ,k}^{(g)})^2}\right) -$$

$$\max_{\xi_i | b_{i,j}=0 \in \Xi} \left(-\frac{|\hat{x}_{TF-EQ,k}^{(g)} - \hat{h}_{TF-EQ,k}^{(g)} \xi_i|^2}{(\sigma_{TF-EQ,k}^{(g)})^2}\right)$$

[Equation 20]

In $L_{TF-EQ,k,j}^{(g)}$ of Equation 20, $g \in [N_G]$, $k \in [M'_g N'_g]$, $j \in [\text{bg}_2 Q]$ may be established. $L_{TF-EQ,k,j}^{(g)}$ may mean a LLR for the j-th bit constituting the data symbol $x_k^{(g)}$ that has undergone the channel equalization in the second 2D domain. In Equation 20, $b_{i,j}$ may mean the j-th bit mapped to the i-th modulation alphabet. In Equation 20, $(:=\{\xi_0, \xi_1, \ldots, \xi_{Q-1}\})$ may mean a modulation alphabet set for Q-ary data symbol modulation. $(\hat{x})_{TD-EQ,k}^{(g)}$ may be the k-th element of a vector $\hat{x}_{TD-EQ}^{(g)}$, and $\hat{x}_{TD-EQ}^{(g)}$ may correspond to a vector (i.e., vec $(\hat{X}_{TD-EQ}^{(g)})$) obtained by vectorizing the matrix $\hat{X}_{TD-EQ}^{(g)}$. The matrix $\hat{X}_{TD-EQ}^{(g)}$ may mean a demodulation signal matrix obtained by replacing $\tilde{Y}^{(g)}$ with $\hat{Y}^{(g)}$ from the demodulation signal matrix as in Equation 10. Similarly, vec $(\hat{X}_{TD-EQ}^{(g)})$ may mean a demodulation signal vector obtained by replacing $\tilde{Y}^{(g)}$ with $\hat{Y}^{(g)}$ from the demodulation signal vector as in Equation 11. $h_{TF-EQ,k}^{(g)}$ may mean diagonal components of the matrix $H_{TF-EQ}^{(g)}$.

Information on an effective channel in the first 2D domain required for calculation of the LLR value $L_{TF-EQ,k,j}^{(g)}$ according to Equation 20 may be obtained in various manners.

Scheme 1) When the demodulator performs the channel estimation using reference signals allocated to resources in the second 2D domain, effective channel information in the first 2D domain may be obtained based on the obtained channel estimation values.

Specifically, the demodulator may perform channel estimation by using reference signals allocated to resources in the second 2D domain. The demodulator may calculate channel equalization coefficients in the second 2D domain from the channel estimation values in the domain of the channel estimation. The demodulator may perform channel equalization using the channel equalization coefficients calculated in the second 2D domain. The demodulator may calculate an effective channel to which the channel equalization is applied. The demodulator may convert the effective channel in the second 2D domain into an effective channel in the first 2D domain. For example, the demodulator may obtain the effective channel information $H_{TF-EQ}^{(g)}$ in the first 2D domain based on calculation as in Equation 21 on the first estimation information matrix $\tilde{H}_{TF}^{(g)}$.

$$H_{TF-EQ}^{(g)} = ((W_{R,t}^{(g)} F_{N_g} (M_D^{(g)})^T)^T \otimes ((M_d^{(g)})^T F_{M_g}^H W_{R,f}^{(g)})) \text{diag}(\text{vec}(E_{TF}^{(g)} \odot \tilde{H}_{TF}^{(g)})) ((M_D^{(g)} F_{N_g}^H W_{T,t}^{(g)})^T \otimes (W_{T,f}^{(g)} F_{M_g} M_d^{(g)}))$$ [Equation 21]

Scheme 2) When the demodulator performs the channel estimation using reference signals allocated to resources in the first 2D domain, and then convert the obtained channel estimation values into channel information in the second 2D domain, the demodulator may obtain an effective channel in the first 2D domain by using the corresponding channel estimation values and applied channel equalization coefficient in the second 2D domain.

Specifically, the demodulator may perform channel estimation by using reference signals allocated to resources in the first 2D domain. The demodulator may convert the channel estimation values in the first 2D domain into channel estimation values in the second 2D domain. The demodulator may calculate channel equalization coefficients in the second 2D domain based on the channel estimation values in the second 2D domain. The demodulator may perform channel equalization using the channel equalization coefficients calculated in the second 2D domain. The demodulator may calculate an effective channel to which the channel equalization is applied. The demodulator may convert the effective channel calculated in the second 2D domain into an effective channel in the first 2D domain. For example, the demodulator may obtain effective channel information $H_{TF-EQ}^{(g)}$ in the first 2D domain based on the operation shown in Equation 22.

$$H_{TF-EQ}^{(g)} = ((W_{R,t}^{(g)} F_{N_g} (M_D^{(g)})^T)^T \otimes ((M_d^{(g)})^T F_{M_g}^H W_{R,f}^{(g)})) \text{diag}(\text{vec}(E_{TF}^{(g)}) \hat{H}_{TF}^{(g)})) ((M_D^{(g)} F_{N_g}^H W_{T,t}^{(g)})^T \otimes (W_{T,f}^{(g)} F_{M_g} M_d^{(g)}))$$ [Equation 22]

Scheme 3) The demodulator may de-spread signals obtained according to the channel equalization in the second 2D domain according to the step S930 to the first 2D domain (i.e., post-processing in the first 2D domain), and may perform channel estimation again in the first 2D domain after de-mapping in the first 2D domain.

Specifically, the demodulator may obtain the channel estimation values in the second 2D domain in the same manner as in Scheme 1) or Scheme 2). The demodulator may calculate channel equalization coefficients in the second 2D domain based on the channel estimation values in the second 2D domain. The demodulator may perform channel equalization using the channel equalization coefficients calculated in the second 2D domain.

The demodulator may convert the reception signals to which the channel equalization is applied in the second 2D domain into signals in the first 2D domain. The demodulator may perform channel estimation using assigned reference signals in the reception signals converted as signals in the first 2D domain. The demodulator may obtain an effective channel estimate in the first 2D domain to which the channel equalization in the first 2D domain is applied. The obtained effective channel estimate may be expressed as Equation 23.

$$H_{TF\text{-}EQ}^{(g)} = ((W_{R,t}^{(g)} F_{N_g}(M_D^{(g)})^T)^T \otimes ((M_d^{(g)})^T F_{M_g}^H W_{R,f}^{(g)})) \text{diag}(\text{vec}(E_{TF}^{(g)}) H_{TF}^{(g)}))((M_D^{(g)} F_{N_g}^H W_{T,t}^{(g)})^T \otimes (W_{T,f}^{(g)} F_{M_g} M_d^{(g)}))$$ [Equation 23]

In Equation 20, $(\sigma_{TF\text{-}EQ,k}^{(g)})^2$ corresponding to a denominator of each term may be defined as Equation 24.

$$(\sigma_{TF\text{-}EQ,k}^{(g)})^2 = \|[(H_{TF\text{-}EQ}^{(g)})^T]_k\|_2^2 - |[H_{TF\text{-}EQ}^{(g)}]_{k,k}|^2 + [z_{TF\text{-}EQ}^{(g)}]_{k,k}$$ [Equation 24]

In Equation 24, $[z_{TF\text{-}EQ}^{(g)}]_{k,k}$ may correspond to the k-th diagonal element of a matrix $Z_{TF\text{-}EQ}^{(g)}$, and $Z_{TF\text{-}EQ}^{(g)}$ may be defined as in Equation 25.

$$z_{TF\text{-}EQ}^{(g)} = n_0 T_{R\text{-}EQ}^{(g)} (T_{R\text{-}EQ}^{(g)})^H$$ [Equation 25]

In Equation 25, $T_{R\text{-}EQ}^{(g)}$ may be defined as Equation 26.

$$T_{R\text{-}EQ}^{(g)} = ((W_{R,t}^{(g)} F_{N_g}(M_D^{(g)})^T)^T \otimes (M_d^{(g)})^T F_{M_g} W_{R,f}^{(g)})) \text{diag}(\text{vec}(E_{TF}^{(g)}))(M_t^{(g)} \otimes ((M_f^{(g)})^T F_M G_R))$$ [Equation 26]

The information of $L_{TF\text{-}EQ,k,j}^{(g)}$ calculated as in Equation 20 may be collected in the original order of the coded bits, the collected information may be input to the channel decoder included in the receiving node, and the channel decoding may be performed. In this case, if necessary, the channel decoding may be performed after performing operations such as de-interleaving, HARQ combining, and rate-de-matching. After the channel decoding, the channel decoder may output information bits (or message bits), and when CRC verification therefor is successful, reception of the corresponding information bits may be completed. In case that the transmitting node segmented data into a plurality of CBs and transmits the plurality of CBs, the CRC verification may be performed for each CB. If the receiving node succeeds in CRC verifications for all CBs, all CBs may be de-segmented, and CRC verification for a TB may be performed. When the CRC verification for the TB is successful, the reception of information bits may be finally completed.

Linear Channel Equalization in First 2D Domain

Hereinafter, a first exemplary embodiment of the channel equalization operation in the first 2D domain according to the step S960 will be described. In an exemplary embodiment of the communication system, the demodulator may obtain data symbols post-processed and de-mapped in the first 2D domain through the step S950. The demodulator may perform channel equalization on the data symbols obtained for each resource block in the first 2D domain (S960). Here, the channel equalization operation according to the step S960 may correspond to a linear channel equalization operation or a multi-tap channel equalization operation.

Specifically, the demodulator may obtain signals or data symbols that have been post-processed and de-mapped in the first 2D domain through the steps S940 and S950. The signal obtained by the demodulator through the step S950 may be expressed as a signal matrix $\tilde{X}^{(g)}$. The demodulator may perform channel equalization on the matrix $\tilde{X}^{(g)}$. A vectorized format vec $(\hat{X}_{dD\text{-}EQ}^{(g)})$ of the channel-equalized output matrix $\hat{X}^{(g)} = \hat{X}_{dD\text{-}EQ}^{(g)}$ may be expressed as in Equation 27.

$$\text{vec}(\hat{X}_{dD\text{-}EQ}^{(g)}) = E_{dD}^{(g)} \text{vec}(\tilde{X}^{(g)})$$ [Equation 27]

In Equation 27, $E_{d,D}^{(g)}$ may be a second channel equalization matrix corresponding to the channel equalization operation according to the step S960. The second channel equalization matrix $E_{dD}^{(g)}$ may be defined as Equation 28 or Equation 29.

$$E_{dD}^{(g)} = (\hat{H}_{dD}^{(g)})^{-1}$$ [Equation 28]

$$E_{dD}^{(g)} = (\hat{H}_{dD}^{(g)})^H (\hat{H}_{dD}^{(g)}(\hat{H}_{dD}^{(g)})^H + \hat{Z}_{dD}^{(g)})^{-1}$$ [Equation 29]

Equation 28 may be regarded as representing the definition of the second channel equalization matrix according to a multi-tap zero forcing (ZF) equalization scheme. Equation 29 may be regarded as representing the definition of the second channel equalization matrix according to a multi-tap minimum mean squared error (MMSE) equalization scheme. In Equation 29, $\hat{Z}_{dD}^{(g)}$ may be defined as $n_0 T_R^{(g)} (T_R^{(g)})^H$.

Ideal channel estimation information used for the channel equalization according to step S960 may be defined as in Equation 30.

$$H_{dD}^{(g)} = T_R^{(g)} \text{bdiag}(H_0, H_1, \ldots H_{N-1}) T_T^{(g)}$$ [Equation 30]

Meanwhile, in an actual communication system, the demodulator may obtain channel estimation information $\hat{H}_{dD}^{(g)}$ based on actual measurement information for a predetermined reference signal. The demodulator may obtain the channel estimation information by performing channel estimation based on one or more reference signals allocated to one or more resources in each resource block in the first 2D domain. Alternatively, the demodulator may perform channel estimation based on one or more reference signals allocated to one or more resources in each resource block in the second 2D domain, and may convert a result of the performed channel estimation to channel estimation information $\hat{H}_{dD}^{(g)}$ in the first 2D domain. For example, it may be the same as or similar to Equation 31.

$$\hat{H}_{dD}^{(g)} = ((W_{R,t}^{(g)} F_{N_g}(M_D^{(g)})^T)^T \otimes (M_d^{(g)})^T F_{M_g}^H W_{R,f}^{(g)}))$$
$$\hat{H}_{TF}^{(g)}((M_D^{(g)} F_{N_g}^H W_{T,t}^{(g)})^T \otimes (W_{T,f}^{(g)} F_{M_g} M_d^{(g)}))$$ [Equation 31]

In Equation 31, $\hat{H}_{TF}^{(g)}$ may correspond to channel estimation information obtained based on one or more reference signals allocated to one or more resources in each resource block in the second 2D domain. That is, according to Equation 31, channel estimation information $\hat{H}_{TF}^{(g)}$ for each resource block obtained by measurement in the second 2D domain may be converted to the channel estimation information $\hat{H}_{TF}^{(g)}$ for each resource block in the first 2D domain. Alternatively, the demodulator may obtain the channel estimation information by using reference signals allocated to resources in the first and second 2D domains together.

In the step S960, the demodulator may perform a channel equalization operation on signals post-processed and de-mapped from resources in the first 2D domain based on the first exemplary embodiment of the channel equalization operation in the first 2D domain. In this case, the output matrix $\hat{X}^{(g)}$ subjected to the channel equalization may replace the matrix $\hat{X}^{(g)}$ in the step S970. The output matrix $\hat{X}^{(g)}$ subjected to the channel equalization in the first 2D domain or the data symbols obtained based on the output matrix $\hat{X}^{(g)}$ may be output as a result of the demodulation operation of the demodulator. Here, log-likelihood ratio (LLR) for the coded bits of each data symbol may be calculated as in Equation 32.

$$L_{dD-EQ,k,j}^{(g)} = \hbar \sum_{\xi_i|b_{i,j}=1\in\Xi} \exp\left(-\frac{|\hat{x}_{dD-EQ,k}^{(g)} - \hat{h}_{dD-EQ,k}^{(g)}\xi_i|^2}{(\sigma_{dD-EQ,k}^{(g)})^2}\right) -$$

$$\hbar \sum_{\xi_i|b_{i,j}=0\in\Xi} \exp\left(-\frac{|\hat{x}_{dD-EQ,k}^{(g)} - \hat{h}_{dD-EQ,k}^{(g)}\xi_i|^2}{(\sigma_{dD-EQ,k}^{(g)})^2}\right) =$$

$$\max_{\xi_i|b_{i,j}=1\in\Xi} *\left(-\frac{|\hat{x}_{dD-EQ,k}^{(g)} - \hat{h}_{dD-EQ,k}^{(g)}\xi_i|^2}{(\sigma_{dD-EQ,k}^{(g)})^2}\right) -$$

$$\max_{\xi_i|b_{i,j}=0\in\Xi} *\left(-\frac{|\hat{x}_{dD-EQ,k}^{(g)} - \hat{h}_{dD-EQ,k}^{(g)}\xi_i|^2}{(\sigma_{dD-EQ,k}^{(g)})^2}\right) \approx$$

$$\max_{\xi_i|b_{i,j}=1\in\Xi} \left(-\frac{|\hat{x}_{dD-EQ,k}^{(g)} - \hat{h}_{dD-EQ,k}^{(g)}\xi_i|^2}{(\sigma_{dD-EQ,k}^{(g)})^2}\right) -$$

$$\max_{\xi_i|b_{i,j}=0\in\Xi} \left(-\frac{|\hat{x}_{dD-EQ,k}^{(g)} - \hat{h}_{dD-EQ,k}^{(g)}\xi_i|^2}{(\sigma_{dD-EQ,k}^{(g)})^2}\right)$$

[Equation 32]

In $L_{dD-EQ,k,j}^{(g)}$ of Equation 32, $g \in [N_G]$, $k\varepsilon[M'_g N'_g]$, $j \in [bg_2 Q]$ may be established. $L_{dD-EQ,k,j}^{(g)}$ may mean the LLR for the j-th bit constituting the data symbol $x_k^{(g)}$ that has undergone channel equalization in the first 2D domain. In Equation 32, $b_{i,j}$ may mean the j-th bit mapped to the i-th modulation alphabet. In Equation 32, $\Xi(:=\{\xi_0, \xi_1, \ldots, \xi_{Q-1}\})$ may mean a modulation alphabet set for Q-ary data symbol modulation. $\hat{x}_{dD-EQ,k}^{(g)}$ may be the k-th element of a vector $\hat{x}_{dD-EQ}^{(g)}$, and $\hat{x}_{dD-EQ}^{(g)}$ may correspond to a vector (i.e., $\text{vec}(\hat{X}_{dD-EQ}^{(g)})$) obtained by o vectorizing the matrix $\hat{X}_{dD-EQ}^{(g)}$. $h_{dD-EQ,k}^{(g)}$ may mean diagonal components of a matrix $H_{dD-EQ}^{(g)}$. The matrix $H_{dD-EQ}^{(g)} = E_{dD}^{(g)}\hat{H}_{dD}^{(g)}$ may mean an effective channel estimation matrix for resources in the g-th resource block in the first 2D domain, and influence of the channel equalization operation $E_{dD}^{(g)}$ in the first 2D domain may be reflected thereto.

In Equation 32, $(\sigma_{dD-EQ}^{(g)})^2$ corresponding to a denominator of each term may be defined as Equation 33.

$$(\sigma_{dD-EQ,k}^{(g)})^2 = \|[(H_{dD-EQ}^{(g)})^T]_k\|_2^2 - |[H_{dD-EQ}^{(g)}]_{k,k}|^2 + [z_{dD-EQ}^{(g)}]_{k,k}$$

[Equation 33]

In Equation 33, $[Z_{dD-EQ}^{(g)}]_{k,k}$ may correspond to the k-th diagonal element of a matrix $Z_{dD-EQ}^{(g)}$. $Z_{dD-EQ}^{(g)}$ may be defined as in Equation 34.

$$Z_{dD-EQ}^{(g)} = n_0 E_{dD}^{(g)} T_R^{(g)} (E_{dD}^{(g)} T_R^{(g)})^H$$

[Equation 34]

The information of $L_{dD-EQ,k,j}^{(g)}$ calculated as in Equation 32 may be collected in the original order of the coded bits, and the collected information may be input to the channel decoder included in the receiving node, and the channel decoding may be performed. In this case, if necessary, the channel decoding may be performed after performing operations such as de-interleaving, HARQ combining, and rate-de-matching. After the channel decoding, the channel decoder may output information bits (or message bits), and when CRC verification therefor is successful, reception of the corresponding information bits may be completed. In case that the transmitting node segmented data into a plurality of CBs and transmits the plurality of CBs, the CRC verification may be performed for each CB. If the receiving node succeeds in CRC verifications for all CBs, all CBs may be de-segmented, and CRC verification for a TB may be performed. When the CRC verification for the TB is successful, the reception of information bits may be finally completed.

Turbo Channel Equalization in First 2D Domain

Hereinafter, a second exemplary embodiment of the channel equalization operation in the first 2D domain according to the step S960 will be described. In an exemplary embodiment of the communication system, the demodulator may obtain data symbols post-processed and de-mapped in the first 2D domain through the step S950. The demodulator may perform channel equalization on the data symbols obtained for each resource block in the first 2D domain (S960). Here, the channel equalization operation according to the step S960 may correspond to a turbo channel equalization scheme. In the turbo channel equalization operation in the first 2D domain, based on the LLR values of the coded bits output from the channel decoder, interference between data symbols generated from different resources in the first 2D domain may be removed and linear channel equalization may be performed. In addition, in the turbo channel equalization operation in the first 2D domain, transmission/reception reliability may be improved by reflecting priori LLR when calculating the LLR of each bit of the original data symbol. The LLR of each of the coded bits output from the channel equalizer performing turbo channel equalization may be input to the channel decoder or the de-interleaver, and based on these, each LLR (i.e., post LLR and/or extrinsic LLR) information for each of the coded bits output after the channel decoding may be obtained. The obtained LLR information may be input to the channel equalizer after interleaving, and the channel equalizer may perform channel equalization according to a turbo channel equalization scheme. The channel equalizer may repeatedly perform the above-described channel equalization operation until the channel decoding succeeds within the maximum number of turbo iterations. As the number of turbo iterations increases, the reliability of the LLRs of the coded bits may be improved, and a reception success rate of TBs may be improved.

Specifically, the demodulator may obtain signals or data symbols subjected to the post-processing and de-mapping in the first 2D domain through the steps S940 and S950. The channel equalizer may perform turbo channel equalization on the obtained data symbols. The channel-equalized data symbol $\hat{x}_{turbo-dD-EQ,k}^{(g)}$ with respect to the k-th data symbol in the g-th resource block in the first 2D domain may be expressed as Equation 35.

$$\hat{x}_{turbo-dD-EQ,k}^{(g)}|_{g\in[N_g],k\in[M'_g N'_g]} = w_k \hat{h}_{dD,k}^{(g)} A^{(g)}(\tilde{x}^{(g)} - \hat{H}_{dD}^{(g)} E[x^{(g)}] + E[x_k^{(g)}]\hat{h}_{dD,k}^{(g)})$$

[Equation 35]

In Equation 35, $\hat{x}_{turbo-dD-EQ,k}^{(g)}$ may correspond to the k-th element of a vector $\hat{x}_{turbo-dD-EQ,k}^{(g)}$ and, the vector $\hat{x}_{turbo-dD-EQ,k}^{(g)}$ may a vector (e.g., $\text{vec}(\hat{X}_{turbo-dD-EQ,k}^{(g)})$) obtained by vectorizing the channel-equalized output matrix $\hat{X}_{turbo-dD-EQ,k}^{(g)}$. A vector $\hat{h}_{dD,k}^{(g)}$ may be the k-th vector constituting a matrix $\hat{H}_{dD}^{(g)}$. Meanwhile, in Equation 35, $w_k = 1/(1+(1-C[x_k^{(g)}])((\hat{h}_{dD,k}^{(g)})^H A^{(g)} \hat{h}_{dD,k}^{(g)}))$ may be established, $A^{(g)}(\hat{H}_{dD}^{(g)}C^{(g)}(\hat{H}_{dD}^{(g)})^H+\hat{Z}_{dD}^{(g)})^{-1}$ may be established, and $E[x^{(g)}]:=[E[x_0^{(g)}] \ E[x_1^{(g)}] \ \ldots \ E[x_{M'_gN'_g-1}^{(g)}]]^T$ may be established. Here, $C[x_k^{(g)}]$ and $E[x_k^{(g)}]$ may be defined as in Equations 36 and 37.

$$E[x_k^{(g)}] = \sum_{i \in [Q]} Pr(x_k^{(g)} = \xi_i)\xi_i \qquad \text{[Equation 36]}$$

$$C[x_k^{(g)}] = \sum_{i \in [Q]} Pr(x_k^{(g)} = \xi_i)|\xi_i|^2 - |E[x_k^{(g)}]|^2 \qquad \text{[Equation 37]}$$

In Equations 36 and 37, when a priori LLR for each bit of $x_k^{(g)}$ is not given (e.g., at initial equalization in turbo iteration), $E[x_k^{(g)}]$ may be set to 0, and $C[x_k^{(g)}]$ may be set to 1.

In Equations 36 and 37, $Pr(x_k^{(g)}=\xi_i)$ may be defined as in Equation 38.

$$Pr(x_k^{(g)} = \xi_i) = \prod_{j \in [bg_2 Q]} \frac{1 + \bar{b}_{i,j}\tanh(\hat{L}_{k,j}^{(g)}/2)}{2} \qquad \text{[Equation 38]}$$

In Equation 38, $\bar{b}_{i,j}$ may be defined as Equation 39.

$$\bar{b}_{i,j}|_{i \in [Q], j \in [bg_2 Q]} := \begin{cases} +1 & \text{if } b_{i,j} = 1 \\ -1 & \text{if } b_{i,j} = 0 \end{cases} \qquad \text{[Equation 39]}$$

In Equation 39, $b_{i,j}(\in\{0,1\})|_{i \in [Q], j \in [bg_2 Q]}$ may mean the j-th bit mapped to the i-th data modulation alphabet $\xi_i(\in\Xi)$.

In Equation 38, $\hat{L}_{k,j}^{(g)}$ may mean a priori LLR for the j-th bit mapped to $x_k^{(g)}$. $\hat{L}_{k,j}^{(g)}$ may be obtained by de-interleaving a posterior LLRs output from the channel decoder.

LLRs for coded bits of data symbols subjected to channel equalization for each resource block in the first 2D domain may be calculated as in Equation 40.

$$L_{turbo-dD-EQ,k,j}^{(g)}|_{g \in [N_G], k \in [M'_g N'_g], j \in [bg_2 Q]} = \qquad \text{[Equation 40]}$$

$$\hbar \sum_{\xi_i | b_{i,j}=1 \in \Xi} \exp\left(-\frac{|\hat{x}_{turbo-dD-EQ,k}^{(g)} - \mu_{k,i}^{(g)}|^2}{(\sigma_{turbo-dD-EQ,k}^{(g)})^2} + \sum_{l \neq j} \frac{\bar{b}_{i,l} L_{k,l}^{(g)}}{2}\right)$$

$$-\hbar \sum_{\xi_i | b_{i,j}=0 \in \Xi} \exp\left(-\frac{|\hat{x}_{turbo-dD-EQ,k}^{(g)} - \mu_{k,i}^{(g)}|^2}{(\sigma_{turbo-dD-EQ,k}^{(g)})^2} + \sum_{l \neq j} \frac{\bar{b}_{i,l} L_{k,l}^{(g)}}{2}\right) =$$

$$\max_{\xi_i | b_{i,j}=1 \in \Xi} * \left(-\frac{|\hat{x}_{turbo-dD-EQ,k}^{(g)} - \mu_{k,i}^{(g)}|^2}{(\sigma_{turbo-dD-EQ,k}^{(g)})^2} + \sum_{l \neq j} \frac{\bar{b}_{i,l} L_{k,l}^{(g)}}{2}\right) -$$

$$\max_{\xi_i | b_{i,j}=0 \in \Xi} * \left(-\frac{|\hat{x}_{turbo-dD-EQ,k}^{(g)} - \mu_{k,i}^{(g)}|^2}{(\sigma_{turbo-dD-EQ,k}^{(g)})^2} + \right.$$

$$\left. \sum_{l \neq j} \frac{\bar{b}_{i,l} L_{k,l}^{(g)}}{2}\right) \approx \max_{\xi_i | b_{i,j}=1 \in \Xi} *$$

$$\left(-\frac{|\hat{x}_{turbo-dD-EQ,k}^{(g)} - \mu_{k,i}^{(g)}|^2}{(\sigma_{turbo-dD-EQ,k}^{(g)})^2} + \sum_{l \neq j} \frac{\bar{b}_{i,l} L_{k,l}^{(g)}}{2}\right) -$$

-continued $$\max_{\xi_i | b_{i,j}=0 \in \Xi} * \left(-\frac{|\hat{x}_{turbo-dD-EQ,k}^{(g)} - \mu_{k,i}^{(g)}|^2}{(\sigma_{turbo-dD-EQ,k}^{(g)})^2} + \sum_{l \neq j} \frac{\bar{b}_{i,l} L_{k,l}^{(g)}}{2}\right)$$

In $L_{turbo-dD-EQ,k,j}^{(g)}$ of Equation 40, $g\in[N_G]$, $k\in[M'_gN'_g]$, $j\in[bg_2 Q]$ may be established. $L_{turbo-dD-EQ,k,j}^{(g)}$ may mean a LLR for the j-th bit constituting the data symbol $x_k^{(g)}$ that has undergone turbo channel equalization in the first 2D domain. In Equation 40, $\mu_{k,i}^{(g)}$ may be defined as Equation 41.

$$\mu_{k,i}^{(g)}|_{g \in [N_g], k \in [M'_g N'_g], i \in [Q]} = \xi_i w_k (\hat{h}_{dD,k}^{(g)})^H \qquad \text{[Equation 41]}$$
$$A^{(g)} \hat{h}_{dD,k}^{(g)}$$

In Equation 40, $(\sigma_{turbo-dD-EQ,k}^{(g)})^2$ corresponding to a denominator of each term may be defined as Equation 42.

$$(\sigma_{turbo-dD-EQ,k}^{(g)})^2|_{g \in [N_g], k \in [M'_g N'_g]} := w_k^2 (\hat{h}_{dD,k}^{(g)})^H A^{(g)}$$
$$\hat{h}_{dD,k}^{(g)} (1 - C[x_k^{(g)}](\hat{h}_{dD,k}^{(g)})^H A^{(g)} \hat{h}_{dD,k}^{(g)}) \qquad \text{[Equation 42]}$$

In Equation 40, $\tilde{L}_{k,l}^{(g)}$ may mean a priori LLR for the l-th bit mapped to $x_k^{(g)}$. $\tilde{L}_{k,l}^{(g)}$ may be obtained by de-interleaving extrinsic LLRs output from the channel decoder. Each of the extrinsic LLRs may be determined as value obtained by subtracting corresponding priori LLRs from corresponding posterior LLRs. In the initial turbo channel equalization, $\tilde{L}_{k,l}^{(g)}$ may be set to 0.

The information of d $L_{turbo-dD-EQ,kj}^{(g)}$ calculated as in Equation 40 may be collected in the original order of the coded bits, and the collected information may be input to the channel decoder included in the receiving node, and the channel decoding may be performed. In this case, if necessary, the channel decoding may be performed after performing operations such as de-interleaving, HARQ combining, and rate-de-matching. After the channel decoding, the channel decoder may output information bits (or message bits), and when CRC verification therefor is successful, reception of the corresponding information bits may be completed. In case that the transmitting node segmented data into a plurality of CBs and transmits the plurality of CBs, the CRC verification may be performed for each CB. If the receiving node succeeds in CRC verifications for all CBs, all CBs may be de-segmented, and CRC verification for a TB may be performed. When the CRC verification for the TB is successful, the reception of information bits may be finally completed.

On the other hand, if the CRC verification is not successful, the receiving node may interleave the posterior LLRs and/or extrinsic LLRs of the coded bits output from the channel decoder, and then use them in the channel equalization in the first 2D domain. Specifically, the receiving node may perform interference cancellation during the channel equalization in the first 2D domain by using the interleaved posterior LLRs and/or extrinsic LLRs. Alternatively, LLR calculation of each coded bit may be performed by reflecting as the priori LLR when de-mapping data symbols in the first 2D domain.

As described above, the receiving node may de-interleave the LLR values output from the channel equalizer, and input the LLR values to the channel decoder. Based on this, the receiving node may perform CRC verification after performing channel decoding again based thereon. If the CRC verification is successful, the reception of information bits may be finally completed. If the CRC verification is not successful, the receiving node may repeatedly perform the above-described turbo channel equalization operations until channel decoding succeeds within the maximum number of turbo iterations. As the number of turbo iterations increases, the reliability of the LLRs of the coded bits may be improved, and a reception success rate of the TBs may be improved.

Reporting Method for Turbo Channel Equalization

Each terminal included in the communication system may use a different channel equalization scheme according to its capability. In case of a terminal supporting turbo channel equalization, a maximum reception delay may be limited by the maximum number of turbo iterations. In addition, when the limit on the maximum number of turbo iterations is equally applied, the reception processing delay may be different depending on a hardware performance of the terminal. The base station may set a HARQ feedback timing in consideration of the reception processing capability of the terminal.

The terminal may transmit a terminal capability report to the base station. Here, the terminal capability report may include at least information related to a channel equalization scheme that the terminal can support. For example, the terminal may support a linear channel equalization scheme or a non-linear channel equalization scheme. As an example of the non-linear channel equalization scheme, the terminal may support the turbo channel equalization scheme. The terminal may transmit, to the base station, the terminal capability report including information on a channel equalization scheme that the terminal can support among various channel equalization schemes.

In an exemplary embodiment of the communication system, the terminal capability report may include information on whether the turbo channel equalization scheme is supported. Alternatively, the terminal capability report may include information on the size of the TB (or a size of a predefined representative TB), MCS (or a predefined representative MCS or CQI, or a predefined representative CQI), and/or a reception processing delay according to the number of turbo channel equalization iterations for a 2D resource block size.

The terminal may transmit a terminal capability report to the base station, and the terminal capability report may include at least information on whether or not to support turbo channel equalization. Alternatively, the terminal capability report may include the size of the TB (or the predefined size of a representative TB, etc.), MCS (or predefined representative MCS, CQI, predefined representative CQI, etc.), and/or information on a reception processing delay according to the number of turbo channel equalization iterations for each 2D resource block size. The base station may semi-statically and/or dynamically configure the HARQ feedback timing or HARQ feedback resource (hereinafter, collectively referred to as HARQ feedback timing) to the terminal based on the information of the terminal capability report received from each terminal.

When the terminal is not configured with a separate HARQ feedback timing by the base station, HARQ feedback may be performed based on a predefined HARQ feedback timing. On the other hand, when the terminal is configured with a HARQ feedback timing semi-statically by the base station, the terminal may change the HARQ feedback timing based on the configured HARQ feedback timing information, and may perform HARQ feedback based on the changed HARQ feedback timing, and may maintain the changed HARQ feedback timing until the next configuration. On the other hand, when the terminal is configured with the HARQ feedback timing dynamically by the base station, the terminal may perform HARQ feedback based on the configured HARQ feedback timing only when receiving a TB related to the dynamically-configured HARQ feedback timing information (or, assignment information including the configured HARQ feedback timing information). In dynamically configuring the HARQ feedback timing to the terminal, the base station may semi-statically configure candidate values of the HARQ feedback timing in advance. If the base station dynamically configures a HARQ feedback timing for the terminal after semi-statically configuring it, the terminal may temporarily replace previous HARQ feedback timing information configured semi-statically with dynamically configured HARQ feedback timing information.

When the terminal is configured with a HARQ feedback timing semi-statically by the base station, and additionally configured with a HARQ feedback timing dynamically (which may be limited to be ahead of the semi-statically configured HARQ feedback timing), the terminal may feedback whether turbo channel equalization processed until transmission of HARQ feedback information at the dynamically configured HARQ feedback timing is prepared is successful, and may feedback whether turbo channel equalization processed until transmission of HARQ feedback information at the semi-statically configured HARQ feedback timing is prepared is successful, only when the corresponding feedback is for a case of reception failure or regardless of the corresponding feedback.

The base station may provide a different CSI measurement/reporting configuration for each terminal based on information of the terminal capability report received from each terminal. As described above, in the turbo channel equalization scheme, a reception success rate and a reception processing delay may be different depending on the maximum number of turbo iterations. Meanwhile, in TB transmission, a required transmission success rate and a required transmission delay may be different depending on a required transmission quality (for each service). In order for the base station to perform link adaptation to enable efficient transmission according to the transmission quality required for a terminal, the base station may configure the terminal to perform CSI or channel quality information (CQI) measurement/reporting according to the required reception success rate and/or the required reception processing delay (or the required HARQ feedback timing). The base station may semi-statically configure the required reception success rate and/or the required reception processing delay (or the required HARQ feedback timing, etc.) to the terminal by using CSI measurement/report configuration information. Each terminal may determine a CQI that can be processed and/or can achieve the required reception success rate within the reception processing delay (or until HARQ feedback information transmission is prepared at the required HARQ feedback timing) according to the capability of the terminal based on the measured channel, and report the determined CQI to the base station. The base station may not configure CQI measurement for each required transmission quality in case of a terminal that does not support turbo channel equalization. Alternatively, the base station may configure the terminal that does not support turbo channel equalization to determine and report a CQI only for each required reception success rate.

Hybrid Linear Channel Equalization in Second 2D Domain and First 2D Domain

The demodulator may perform channel equalization for each resource group in the first 2D domain on data symbols subjected to post-processing and de-mapping in the first 2D domain after demodulation and de-mapping in the second 2D domain. The output matrix $\hat{X}$, which is obtained by performing multi-tap linear channel equalization on the signal matrix $\tilde{X}^{(g)}$ multi-carrier-demodulated and de-mapped for the g-th resource group in the first 2D domain, may be expressed as in vec $(\hat{X}_{TF-dD-EQ}^{(g)})|_{g \in [N_g]} := E_{TF-dD}^{(g)}$vec $(\hat{X}_{TF-EQ}^{(g)}$. Here $E_{Tf-dD}^{(g)}$ may be $(\hat{H}_{TF-dD}^{(g)})^\dagger$ in case of multi-tap ZF channel equalization), or $(\hat{H}_{TF-dD}^{(g)})^H$ $(\hat{H}_{TF-dD}^{(g)}(\hat{H}_{TF-dD}^{(g)})^H + \hat{Z}_{TF-dD}^{(g)})^{-1}$ (in case of multi-tap MMSE channel equalization).

Here, although ideal channel estimation used for channel equalization may be given as $H_{TF-dD}^{(g)} := T_{R-EQ}^{(g)}$bdiag$(H_0, H_1, \ldots, H_{N-1})T_T^{(g)}$, in practice, an actual channel estimation $\hat{H}_{TF-dD}^{(g)}$ directly estimated from a reference signal may be used. For example, a channel estimation estimated from reference signal(s) allocated to resource(s) in a corresponding resource block in the first 2D domain may be used. Alternatively, channel estimation information obtained by converting a channel estimated from the reference signal(s) allocated to the resource(s) in the corresponding resource block in the second 2D domain to a channel in the first 2D domain may be used. In this case, $\hat{H}_{TF-dD}^{(g)} = U_R^{(g)}$diag(vec $(E_{TF}^{(g)}))\hat{H}_{TF}^{(g)}U_T^{(g)}$ may be established. Here, $U_R^{(g)} = ((W_{R,t}^{(g)}F_{N_d}(M_D^{(g)})^T)^T \otimes ((M_d^{(g)})^T F_{M_d}^H W_{R,f}^{(g)}))$ and $U_T^{(g)} = ((M_D^{(g)}F_{N_g}^{(g)}W_{t,t}^{(g)})^T \otimes (W_{T,f}^{(g)}F_{M_d}^{(g)}M_d^{(g)}))$. $\hat{H}_{TF}^{(g)}$ may mean channel estimation information estimated from reference signal(s) allocated to resource(s) in the g-th resource block in the second 2D domain, and $\hat{H}_{dD}^{(g)}$ may mean a channel estimate obtained by converting $\hat{H}_{TF}^{(g)}$ into a channel in the first 2D domain. Alternatively, a channel estimate estimated by using the reference signal(s) allocated to the resource(s) in each corresponding resource block in both the second 2D domain and the first 2D domain may be used. Meanwhile, $\hat{Z}_{TF-dD}^{(g)} = n_0 T_{R-EQ}^{(g)}(T_{R-EQ}^{(g)})^H$.

After performing post-processing and de-mapping of the demodulated signal subjected to channel equalization for each resource group in the second 2D domain from the resources in each corresponding resource group in the first 2D domain as described above, LLRs for the coded bits of each data symbol may be calculated as in Equation 43.

$$L_{TF-dD-EQ,k,j}^{(g)}|_{g \in [N_G], k \in [M'_g N'_g], j \in [bg_2 Q]} = \quad [\text{Equation 43}]$$

$$\hbar \sum_{\xi_i|b_{i,j}=1 \in \Xi} \exp\left(-\frac{|\hat{x}_{TF-dD-EQ,k}^{(g)} - \hat{h}_{TF-dD-EQ,k}^{(g)}\xi_i|^2}{(\sigma_{TF-dD-EQ,k}^{(g)})^2}\right) +$$

$$\hbar \sum_{\xi_i|b_{i,j}=0 \in \Xi} \exp\left(-\frac{|\hat{x}_{TF-dD-EQ,k}^{(g)} - \hat{h}_{TF-dD-EQ,k}^{(g)}\xi_i|^2}{(\sigma_{TF-dD-EQ,k}^{(g)})^2}\right) =$$

$$\max_{\xi_i|b_{i,j}=1 \in \Xi} *\left(-\frac{|\hat{x}_{TF-dD-EQ,k}^{(g)} - \hat{h}_{TF-dD-EQ,k}^{(g)}\xi_i|^2}{(\sigma_{TF-dD-EQ,k}^{(g)})^2}\right) -$$

$$\max_{\xi_i|b_{i,j}=0 \in \Xi} *\left(-\frac{|\hat{x}_{TF-dD-EQ,k}^{(g)} - \hat{h}_{TF-dD-EQ,k}^{(g)}\xi_i|^2}{(\sigma_{TF-dD-EQ,k}^{(g)})^2}\right) \approx$$

$$\max_{\xi_i|b_{i,j}=1 \in \Xi} *\left(-\frac{|\hat{x}_{TF-dD-EQ,k}^{(g)} - \hat{h}_{TF-dD-EQ,k}^{(g)}\xi_i|^2}{(\sigma_{TF-dD-EQ,k}^{(g)})^2}\right) -$$

$$\max_{\xi_i|b_{i,j}=0 \in \Xi} *\left(-\frac{|\hat{x}_{TF-dD-EQ,k}^{(g)} - \hat{h}_{TF-dD-EQ,k}^{(g)}\xi_i|^2}{(\sigma_{TF-dD-EQ,k}^{(g)})^2}\right)$$

In Equation 43, $L_{TF-dD-EQ,k,j}^{(g)}$ may mean the LLR of the j-th bit of the data symbol $x_k^{(g)}$ after the linear channel equalization in the first 2D domain and the linear channel equalization in the second 2D domain. $\hat{x}_{TF-dD-EQ,k}^{(g)} = [\hat{x}_{TF-dD-EQ}^{(g)}]_k$, $\hat{x}_{TF-dD-EQ}^{(g)} = \text{vec}(\hat{X}_{TF-dD-EQ}^{(g)})$, and $h_{TF-dD-EQ,k}^{(g)} = [H_{TF-dD-EQ}^{(g)}]_{k,k}$. $H_{TF-dD-EQ}^{(g)} := E_{TF-dD}^{(g)}\hat{H}_{TF-dD}^{(g)}$ may be established, and this may mean an effective channel estimate matrix (to which influence of the channel equalization in the first 2D domain is reflected) for resources in the g-th resource group in the first 2D domain. $(\sigma_{TF-dD-EQ,k}^{(g)})^2 := \|[H_{TF-dD-EQ}^{(g)}]^T\|_2^2 - |[H_{TF-dD-EQ}^{(g)}]_{k,k}|^2 + [Z_{TF-dD-EQ}^{(g)}]_{k,k}$, and $Z_{TF-dD-EQ}^{(g)} := n_0 E_{TF-dD}^{(g)} T_{R-EQ}^{(g)}(E_{TF-dD}^{(g)} T_{R-EQ}^{(g)})^H)$.

The information of $L_{TF-dD-EQ,k,j}^{(g)}$ calculated as in Equation 43 may be collected in the original order of the coded bits, and the collected information may be input to the channel decoder included in the receiving node, and the channel decoding may be performed. In this case, if necessary, the channel decoding may be performed after performing operations such as de-interleaving, HARQ combining, and rate-de-matching. After the channel decoding, the channel decoder may output information bits (or message bits), and when CRC verification therefor is successful, reception of the corresponding information bits may be completed. In case that the transmitting node segmented data into a plurality of CBs and transmits the plurality of CBs, the CRC verification may be performed for each CB. If the receiving node succeeds in CRC verifications for all CBs, all CBs may be de-segmented, and CRC verification for a TB may be performed. When the CRC verification for the TB is successful, the reception of information bits may be finally completed.

The steps S910 to S970 or the functional blocks corresponding to the respective steps constituting the demodulation process performed by the demodulator described with reference to FIG. 9 are expressed in form of matrix operations or vector operations such as Equations 6 to 42. However, this is only an example for convenience of description, and exemplary embodiments of the present disclosure are not limited thereto. The expressions based on the matrix operations may be viewed as simple mathematical expressions of effects of functions between input and output of the respective functional blocks. For example, a product with a DFT matrix may be treated as an FFT, and a product with an IDFT matrix may be treated as an IFFT. A product with the reception pulse shaping matrix $G_R$ may be performed as multiplying time samples of the modulation signal with respective corresponding coefficients of a pulse. When the function of the reception pulse shaping matrix includes the CP removal and/or down-sampling, it may be performed by taking only some time samples or by accumulating periodically repeating time samples. The resource mapping operation may be processed by indexing or mapping rather than the matrix operation.

2D Spreading Resource Block Size Setting Method

The base station may set the size of the 2D spreading resource block to the terminal. The terminal may perform spreading from the first 2D domain to the second 2D domain for each 2D spreading resource block during transmission by using the size of the 2D spreading resource block set by the base station. Alternatively, the terminal may perform de-spreading from the second 2D domain to the first 2D domain for each 2D spreading resource block during reception by using the size of the 2D spreading resource block set by the base station. Here, the size of the 2D spreading resource block may be set in the following manner.

The base station may set the 2D resource spreading block size to be the same or different for each link type such as downlink, uplink, and sidelink. The base station may set the 2D spreading resource block size differently for each terminal or for each terminal group. In other words, the base station may set the 2D spreading resource block size to be terminal-specific or terminal-group-specific. Alternatively, the base station may set the 2D spreading resource block size to be common for at least some of a plurality of terminals or a plurality of terminal groups.

Meanwhile, during wireless transmission, the size of resources allocated for a terminal or a specific transmission may vary. Here, the base station may determine the 2D spreading resource block size differently or uniformly according to the size of allocated resources. Specifically, resource allocation information in the second 2D domain may be included in allocation information for downlink, uplink, sidelink, or other link type allocated by the base station to the terminal. The allocated resources in the second 2D domain may be divided by the 2D spreading resource block size set by the base station. When the resources in the second 2D domain are not divided by the set the 2D spreading resource block size, some of the spreading resource blocks may be defined to have a size smaller than the 2D spreading resource block size set by the base station, and the remaining 2D spreading resource blocks may be defined to have the size set by the base station. Here, the resource blocks defined to have a size smaller than the size set by the base station may be composed of time and/or frequency resources having relatively high indexes. Alternatively, the resource blocks defined to have a size smaller than the size set by the base station may be composed of time and/or frequency resources having relatively low indexes.

The 2D spreading resource block size may be expressed as a combination of a Doppler-to-time spreading resource size for spreading from the Doppler domain to the time domain and a delay-to-frequency spreading resource size. For example, the size of the 2D spreading resource block may be set in the following manner.

Set the size of a Doppler-to-time block for spreading from the Doppler domain to the time domain for each multi-carrier symbol (or OFDM symbol) within a TTI For example, if the number of multi-carrier symbols within a TTI is given as 2, 7, 14, 28, or 56, set the size of the Doppler-to-time block (unit: the number of multicarrier symbols or the number of OFDM symbols) for each case Set the size of a delay-to-frequency block for spreading from the delay domain to the frequency domain for each frequency resource block (RB), subband, or precoding resource group (PRG) size within a bandwidth For example, if the number of RBs within the bandwidth is given as 4, 8, 16, 32, or 64, set the size of the delay-to-frequency block (unit: the number of subcarriers, the number of RBs, the number of subbands, the number of PRGs) for each case Resources indicated by the resource allocation information in the second 2D domain may be limited to consecutive allocation. Alternatively, the allocation may be consecutive only within a spreading resource group composed of a certain number of consecutive resources, and continuity may not be limited between the spreading resource groups.

Alternatively, the continuity of all allocated resources may not be limited in the allocation. When non-consecutive resource allocation in resource units or spread resource group units is allowed, logically consecutive resources may be sequentially configured after de-mapping from the second 2D domain, the logically consecutive resources may be divided by the 2D spreading resource block size set by the base station, and allocated to the 2D spreading resource groups. Alternatively, when non-consecutive resource allocation in units of a spreading resource group is allowed, the configuration may be restricted so that the 2D spreading resource block size is a multiple of the spreading resource group size (the two sizes may be limited to one time the same). Alternatively, the resource allocation itself may be restricted so that the allocated resources in the second 2D domain corresponding to each 2D spreading resource block have continuity regardless of the continuity of the allocated resources. That is, even when the resource allocation information supports non-consecutive resource allocation, resource allocation in the second 2D domain may be restricted so that resources in the second 2D domain are allocated consecutively in units of at least the 2D spread resource block size. (Alternatively, the terminal may not expect non-compliant resource allocation.)

The base station may signal the 2D spreading resource block size to each terminal, and each terminal may set the size of the 2D spreading resource block according to the signaling from the base station. The signaling for the 2D spreading resource block size may be performed in the following manner.

The 2D spreading resource block size may be set differently for each terminal or terminal group. Alternatively, the 2D spreading resource block size may be set to be the same for a plurality of terminals or a plurality of terminal groups.

The spreading resource block size may be set to be the same or different for each link type such as uplink, downlink, and sidelink.

In the case of downlink, the base station transmits a signal through a multi-carrier modulation process based on the 2D spreading resource block size signaled to the terminal.

In the case of downlink, the terminal receives a signal through a multi-carrier demodulation process based on the 2D spreading resource block size set through signaling from the base station.

In the case of uplink, the terminal transmits a signal through a multi-carrier modulation process based on the 2D spreading resource block size set through signaling from the base station.

In the case of uplink, the base station receives a signal through a multi-carrier demodulation process based on the 2D spreading resource block size signaled to the terminal.

Radio Resource Control (RRC) Message Signaling or Medium Access Control (MAC) Control Element CE) Signaling The terminal changes the setting of the 2D spreading resource block size to the currently signaled setting, and maintains the changed setting until the next signaling is received.

Combination of RRC Message Signaling and MAC CE Signaling

The base station sets a spreading resource block size candidate through RRC message signaling (the terminal changes the setting of the 2D spreading resource block size to the currently signaled setting, and maintains the changed setting until the next signaling is received.)

The base station sets the 2D spreading resource block size by referring to a specific value according to MAC CE signaling from a candidate group set in advance through RRC message signaling (the terminal changes the setting of the 2D spreading resource block size to the currently signaled setting, and maintains the changed setting until the next signaling is received.)

Combination of RRC Message Signaling and DCI (or UCI) Signaling

The base station sets a spreading resource block size candidate through RRC message signaling (the terminal changes the setting of the 2D spreading resource block size to the currently signaled setting, and maintains the changed setting until the next signaling is received.)

The base stat ion sets the 2D spreading resource block size by referring to a specific value according to DCI (or UCI) signaling from a candidate group set in advance through RRC message signaling (the terminal sets a 2D spreading resource block size to the 2D spreading resource block size indicated by the base station, only for reception (or transmission) of a TB associated with DCI (or UCI) signaled from the base station).

As a fallback mode, the base station may pre-define spreading of the entire resources for which the number of spreading resource blocks is 1. Alternatively, the size of a specific resource block may be predefined.

Signaling on whether 2D spreading is applied may be performed in the following manner.

The base station signals to the terminal whether 2D spreading is applied.
  It may be a terminal (or terminal group)-specific setting or a setting common to all terminals.
  It may be set for each link type (e.g., uplink, downlink, sidelink, etc.) or may be a common setting regardless of link type.
  One dimension of 2D may correspond to the frequency domain and the other dimension may correspond to the time domain.
  Whether to apply spreading for each dimension may be signaled as being separated.
  A mode that does not apply spreading for both dimensions may correspond to, for example, OFDM (or OFDMA).
  A mode that applies spreading only to the frequency domain may correspond to, for example, SC-FDM (or SC-FDMA).

RRC Message, MAC CE, or DCI (or UCI)

RRC message or MAC CE signaling: The terminal changes the setting of the 2D spreading resource block size to the currently signaled setting, and maintains the changed setting until the next signaling is received.
DCI (or UCI) signaling: The terminal applies whether 2D spreading is applied, only for reception (or transmission) of a TB associated with DCI (or UCI) signaled from the base station).
As a fallback mode, the base station may pre-define activation or deactivation of application of 2D spreading.

Downlink Allocation Method in Case of Multiple Access Only in Second 2D Domain

A downlink allocation method in case of multiple access only in the second 2D domain will be described. Here, the multiple access in the second 2D domain may mean that resources in the second 2D domain are orthogonally allocated to different terminals (or, terminal groups, hereinafter collectively referred to as 'terminals'). As describe above, the base station may perform multi-carrier modulation by spreading data symbols and reference signals mapped to resources in the first 2D domain to resources in the second 2D domain allocated terminal-specifically, in downlink transmissions to the respective terminals.

The downlink allocation information may include at least a carrier indicator, a bandwidth part (BWP) indicator, time domain resource allocation information and frequency domain resource allocation information and/or as resource allocation information in the second 2D domain, a modulation and coding scheme (MCS), a new data indicator (NDI), a redundancy version (RV), and/or a HARQ process number. Additional information not mentioned may be included in the downlink allocation information.

The frequency domain resource allocation information may be configured in units of resource blocks (RBs) each of which is composed of a predetermined number (e.g., 12) of subcarriers. The frequency domain resource allocation information may be configured as a bitmap indicating whether or not each RB is allocated, or may be configured with an index indicating a start RB and an index indicating the number of allocated RBs. The range of the RBs may be limited to RBs within the BWP corresponding to the BWP indicator.

The time domain resource allocation information may be configured with an index indicating a start MC symbol (or OFDM symbol, hereinafter collectively referred to as 'MC symbol') and an indicating the length of MC symbols. The above-described frequency domain resource allocation information and time domain resource allocation information may support only allocation of consecutive MC symbols, but may not exclude non-consecutive time domain resource allocation and information about it.

The terminal may perform multi-carrier demodulation on the MC symbols indicated by the time domain resource allocation information. After multi-carrier demodulation, the terminal may de-map (spread) data symbols from subcarriers indicated by the frequency domain resource allocation information in the MC symbols indicated by the time domain resource allocation information. If necessary, the terminal may perform second 2D domain channel estimation and/or channel equalization on the de-mapped data symbols in the second 2D domain. As described above, the de-mapped data symbols may correspond to each 2D spreading resource group according to a predefined rule. The above-described post-processing may be performed for each spreading resource group, and then de-mapping therefor may be performed in the first 2D domain. For each spreading resource group, channel estimation and/or channel equalization in the first 2D domain may be performed on the de-mapped data symbols in the first 2D domain. For each data symbol that has undergone demodulation and channel equalization in the above-described manner, data symbol de-mapping may be performed according to the MCS included in downlink allocation information to obtain LLRs for the respective coded bits, and then information or message bits may be obtained through a channel decoding process.

Downlink Allocation Method in Case of Multiple Access in First and Second 2D Domains A downlink allocation method in case of multiple access in the second 2D domain and the first 2D domain will be described. The case of multiple access only in the first 2D domain without multiple access in the second 2D domain may be regarded as a special case of multiple access in the second 2D domain and the first 2D domain. Here, the multiple access in the second 2D domain may mean that resources in the second 2D domain are allocated orthogonally to different terminals (or terminal groups, hereinafter, collectively referred to as 'terminals'). In this case, the resources may be defined through explicit signaling, defined implicitly from other allocation information, or pre-defined. The multiple access in the first 2D domain may mean that resources in the first 2D domain are allocated orthogonally to different terminals (or terminal groups, hereinafter, collectively referred to as 'terminals'). The multiple access in the first 2D domain is not required between terminals to which the multi-access in the second 2D domain is applied. The multiple access in the first 2D domain may be applied to the terminals to which the same resources are allocated in the second 2D domain. As describe above, the base station may map data symbols and reference signals to terminal-specifically allocated resources in the first 2D domain, and the may perform multi-carrier modulation by spreading the data symbols and reference signals to terminal-specifically allocated resources in the second 2D domain. In general, since data symbols mapped to different resources in the first 2D domain within the same spreading resource group experience the same channel, it may be preferable to allocate consecutive resources in the first 2D domain to each terminal. A terminal-specific or common reference signal(s) may be transmitted in the first 2D domain. When the number of spreading resource groups is plural, resource allocation for each spreading resource group may be restricted to the same resources in the first 2D domain, and resources allocated in the first 2D domain may be applied differently according to the spreading resource group based on a resource hopping rule. In addition to the above scheme, other schemes are not excluded.

If both of the above schemes are supported (or all of a plurality of schemes are supported), the base station may configure in advance which rule to apply to the terminal.

The downlink allocation information may include at least a carrier indicator, a BWP part indicator, Doppler domain resource allocation information and delay domain resource allocation information as resource allocation information in the first 2D domain, an MCS, an NDI, an RV, and/or a HARQ process number. Additional information not mentioned may be included in the downlink allocation information. The allocated resources in the second 2D domain may be pre-defined. Alternatively, resource allocation in the 2D domain may be defined in advance to be implicitly referred to from other allocation information. As an example, resource allocation in the second 2D domain may be defined in advance as resources within the BWP indicated by the BWP indicator. As resource allocation information in the second 2D domain, time domain resource allocation information and/or Doppler domain resource allocation information may be included in the downlink allocation information or may be configured through signaling such as RRC message or MAC CE. As resource allocation information in the second 2D domain, only the time domain resource allocation information may be configured through the downlink allocation information, RRC message, or MAC CE, and the frequency domain resource allocation information may be defined in advance. As resource allocation information in the second 2D domain, only the frequency domain resource allocation information may be configured through the downlink allocation information, RRC message, or MAC CE, and the time domain resource allocation information may be defined in advance. In the time domain resource allocation signaling through the downlink allocation information, the method described above in 'downlink allocation method in case of multiple access only in second 2D domain' may be equally applied. In the frequency domain resource allocation signaling through the downlink allocation information, the method described above in 'downlink allocation method in case of multiple access only in second 2D domain' may be equally applied.

The terminal may perform multi-carrier demodulation on MC symbols indicated (or predefined) by the time domain resource allocation information (signaled through downlink allocation information, RRC message, or MAC CE). After multi-carrier demodulation, in each of the MC symbols on the time-frequency domain resources, the terminal may de-map (spread) data symbols from subcarriers indicated (or predefined) by the frequency domain resource allocation (signaled through downlink allocation information, RRC message, or MAC CE). If necessary, the terminal may perform second 2D domain channel estimation and/or channel equalization on the de-mapped data symbols in the second 2D domain. As described above, the de-mapped data symbols may correspond to each 2D spreading resource group according to a predefined rule. The above-described post-processing may be performed for each 2D spreading resource group, and then de-mapping from the resources indicated by the resource allocation information in the first 2D domain may be performed terminal-specifically for each spreading resource group. First 2D domain channel estimation and/or channel equalization may be performed on the data symbols de-mapped in the first 2D domain. If necessary, in order to mitigate/suppress/remove interference caused by the multiple access in the first 2D domain within the same spreading resource group, channel estimation and/or channel equalization may be jointly performed across terminals to which the multiple access in the first 2D domain is applied within the same spreading resource group. For each data symbol that has undergone demodulation and channel equalization in the above-described manner, data symbol de-mapping may be performed to obtain LLRs for the respective coded bits, and then information or message bits may be obtained through a channel decoding process. Guard resource(s) may be inserted between resources allocated to different terminals in order to limit the influence of interference between the terminals to which the multiple access in the first 2D domain is applied within the same spreading resource group.

Uplink Allocation Method

The above-described 'downlink allocation method in case of multiple access only in second 2D domain' and/or the above-described 'downlink allocation method in case of multiple access in first and second 2D domains' may be applied equally. However, there is a difference in that the terminal performs transmission instead of reception according to uplink allocation of the base station, and the base station performs reception instead of transmission according to the uplink allocation. Also, although uplink allocation information may have a different configuration from the downlink allocation information, at least the components listed as being included in the downlink allocation information above may be included in the uplink allocation information.

According to an exemplary embodiment of the present disclosure, information bits in a transport block may be transmitted and received based on a modulation and demodulation operation of a multi-carrier waveform based on spreading of multiple two-dimensional (2D) resource blocks. Accordingly, a diversity gain of a channel experienced by each symbol in a codeword can be improved. In addition, interference between data symbols according to multiplexing can be reduced or limited due to channel spreading.

According to an exemplary embodiment of the present disclosure, multi-carrier demodulation and channel equalization may be performed for each 2D resource block in a receiving node. Accordingly, reception processing delay can be reduced. Here, the channel equalization may be performed based on a linear channel equalization scheme or a turbo channel equalization scheme. Accordingly, an error rate such as BER, SER, and BLER can be reduced, and reception performance of the receiving node can be improved.

However, the effects that can be achieved by the modulation and demodulation method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first communication node, the operation method comprising:
    performing, with a second communication node of the communication system, a signaling procedure for first information;
    mapping data symbols to be transmitted to the second communication node to one or more first spreading resource blocks constituting a first 2D domain;
    pre-processing the data symbols mapped to the one or more first spreading resource blocks to spread the data symbols on one or more second spreading resource blocks constituting a second 2D domain;
    mapping the pre-processed data symbols to the one or more second spreading resource blocks; and
    performing multi-carrier modulation on the pre-processed data symbols mapped to the one or more second spreading resource blocks for each of resources in the one or more second spreading resource blocks in the second 2D domain,
    wherein the first information includes information on a size of the one or more first spreading resource blocks and the one or more second spreading resource blocks.

2. The operation method according to claim 1, wherein the mapping to the one or more first spreading resource blocks comprises:
    identifying information on the one or more first spreading resource blocks; and
    mapping the data symbols to each of the one or more first spreading resource blocks.

3. The operation method according to claim 2, wherein a first dimension of the first 2D domain is a delay domain, a second dimension of the first 2D domain is a Doppler domain, and the one or more first spreading resource blocks correspond to delay-Doppler resource blocks.

4. The operation method according to claim 1, wherein the mapping to the one or more second spreading resource blocks comprises:
    identifying information on the one or more second spreading resource blocks; and
    mapping the data symbols pre-processed after being mapped to each of the one or more first spreading resource blocks to each of the one or more second spreading resource blocks.

5. The operation method according to claim 4, wherein a first dimension of the second 2D domain is a frequency domain, a second dimension of the second 2D domain is a time domain, and the one or more second spreading resource blocks correspond to frequency-time resource blocks.

6. The operation method according to claim 1, wherein the performing of the signaling procedure comprises: receiving signaling for the first information from the second communication node that provides a communication service to the first communication node.

7. The operation method according to claim 1, wherein the performing of the signaling procedure comprises: signaling, by the first communication node, the first information to one or more communication nodes including the second communication node providing a communication service.

8. The operation method according to claim 1, wherein the performing of the signaling procedure comprises:
    performing, with the second communication node, a signaling procedure for information of candidates of the size of the one or more first spreading resource blocks and the one or more second spreading resource blocks; and
    performing, with the second communication node, a signaling procedure for information indicating one of the candidates of the size of the one or more first spreading resource blocks and the one or more second spreading resource blocks.

9. An operation method of a first communication node, the operation method comprising:
    performing, with a second communication node of the communication system, a signaling procedure for first information;
    performing multi-carrier demodulation on radio signals received from the second communication node for each of resources in one or more first spreading resource blocks constituting a first 2D domain;

de-mapping data symbols mapped to the one or more first spreading resource blocks from the one or more first spreading resource blocks based on a result of the multi-carrier demodulation;

post-processing the data symbols de-mapped from the one or more first spreading resource blocks domain to de-spread the data symbols to one or more second spreading resource blocks constituting a second 2D domain; and de-mapping the post-processed data symbols from the one or more second spreading resource blocks in the second 2D domain, wherein the first information includes information on a size of the one or more first spreading resource blocks and the one or more second spreading resource blocks.

10. The operation method according to claim 9, wherein the de-mapping from the one or more first spreading resource blocks comprises:

identifying information on the one or more first spreading resource blocks; and de-mapping the data symbols mapped to each of the one or more first spreading resource blocks from the one or more first spreading resource blocks, wherein a first dimension of the first 2D domain is a frequency domain, a second dimension of the first 2D domain is a time domain, and the one or more first spreading resource blocks correspond to frequency-time resource blocks.

11. The operation method according to claim 9, wherein the de-mapping from the one or more second spreading resource blocks comprises:

identifying information on the one or more second spreading resource blocks; and de-mapping the data symbols post-processed and mapped to each of the one or more second spreading resource blocks from the one or more second spreading resource blocks, wherein a first dimension of the second 2D domain is a delay domain, a second dimension of the second 2D domain is a Doppler domain, and the one or more second spreading resource blocks correspond to delay-Doppler resource blocks.

12. The operation method according to claim 9, wherein the performing of the signaling procedure comprises: receiving signaling for the first information from the second communication node that provides a communication service to the first communication node.

13. The operation method according to claim 9, wherein the performing of the signaling procedure comprises: signaling, by the first communication node, the first information to one or more communication nodes including the second communication node to which the first communication node provides a communication service.

14. The operation method according to claim 9, wherein the performing of the signaling procedure comprises:

performing, with the second communication node, a signaling procedure for information of candidates of the size of the one or more first spreading resource blocks and the one or more second spreading resource blocks; and performing, with the second communication node, a signaling procedure for information indicating one of the candidates of the size of the one or more first spreading resource blocks and the one or more second spreading resource blocks.

15. The operation method according to claim 9, further comprising, after the de-mapping from the one or more first spreading resource blocks, performing channel equalization in the first 2D domain, for the data symbols de-mapped from the one or more first spreading resource blocks.

16. The operation method according to claim 15, wherein the performing of the channel equalization in the first 2D domain comprises:

performing channel estimation in the first 2D domain;

calculating channel equalization coefficients in the first 2D domain based on a result of the channel estimation in the first 2D domain; and performing the channel equalization in the first 2D domain based on the calculated channel equalization coefficients in the first 2D domain.

17. The operation method according to claim 9, further comprising, after the de-mapping from the one or more second spreading resource blocks, performing channel equalization in the second 2D domain for the data symbols de-mapped from the one or more second spreading resource blocks.

18. An operation method of a first communication node, the operation method comprising:

transmitting, to a second communication node of the communication system, a terminal capability report related to channel equalization in at least one of a first two-dimensional (2D) domain and a second 2D domain;

performing multi-carrier demodulation on radio signals received from the second communication node for each of resources in the first 2D domain;

de-mapping data symbols mapped to the resources in the first 2D domain from the resources in the first 2D domain based on a result of the multi-carrier demodulation;

post-processing the data symbols de-mapped from the resources in the first 2D domain to de-spread the data symbols to resources in the second 2D domain; and de-mapping the post-processed data symbols from the resources in the second 2D domain, wherein the channel equalization in the at least one of the first 2D domain and the second 2D domain is performed after at least one of the de-mapping the data symbols and the de-mapping the post-processed data symbols.

* * * * *